(12) United States Patent  
Roytman et al.

(10) Patent No.: US 8,209,702 B1  
(45) Date of Patent: *Jun. 26, 2012

(54) TASK EXECUTION USING MULTIPLE POOLS OF PROCESSING THREADS, EACH POOL DEDICATED TO EXECUTE DIFFERENT TYPES OF SUB-TASKS

(75) Inventors: Evgeny Roytman, Sharon, MA (US); Michael G. Hegerich, Holliston, MA (US); Michael J. Virgil, Northborough, MA (US)

(73) Assignee: EMC Corporation, Hopkinton, MA (US)

( * ) Notice: Subject to any disclaimer, the term of this patent is extended or adjusted under 35 U.S.C. 154(b) by 1225 days.

This patent is subject to a terminal disclaimer.

(21) Appl. No.: 11/863,042

(22) Filed: Sep. 27, 2007

(51) Int. Cl.  
G06F 9/46 (2006.01)

(52) U.S. Cl. ........................................................ 718/106

(58) Field of Classification Search .................. 718/106  
See application file for complete search history.

(56) References Cited

U.S. PATENT DOCUMENTS

| | | | |
|---|---|---|---|
| 6,542,920 B1 * | 4/2003 | Belkin et al. ................. | 718/104 |
| 6,687,729 B1 * | 2/2004 | Sievert et al. ................ | 718/102 |
| 6,725,336 B2 * | 4/2004 | Cherabuddi ................. | 711/129 |
| 6,938,257 B1 * | 8/2005 | Rapp et al. .................. | 719/311 |
| 7,257,633 B2 * | 8/2007 | Masputra et al. ............ | 709/226 |
| 7,451,445 B1 * | 11/2008 | Eppstein ..................... | 718/100 |
| 2003/0088609 A1 * | 5/2003 | Guedalia et al. ............. | 709/107 |
| 2004/0199926 A1 * | 10/2004 | Gilgen et al. ................ | 719/318 |
| 2007/0203910 A1 * | 8/2007 | Ferguson et al. ............. | 707/8 |

* cited by examiner

*Primary Examiner* — Meng An  
*Assistant Examiner* — Wissam Rashid  
(74) *Attorney, Agent, or Firm* — Krishnendu Gupta; Gerald P. Kazanjian

(57) ABSTRACT

A task analyzer analyzes received tasks to identify and classify corresponding sub-tasks. For example, for each given received task, the task analyzer analyzes a given task to identify a first type of sub-tasks (e.g., sub-tasks that can be executed in any order). The task analyzer also analyzes the given task to identify a second type of sub-tasks (e.g., sub-tasks that are to be executed in parallel) associated with the given task. A task execution manager submits the first type of sub-tasks for execution by a first pool of processing threads, which is dedicated for executing the first type of sub-tasks. The task execution manager submits the second type of sub-tasks for execution by the second pool of processing threads. The second pool of processing threads is dedicated to execute the second type of sub-tasks.

16 Claims, 14 Drawing Sheets

TASK EXECUTION USING MULTIPLE POOLS OF PROCESSING THREADS, EACH POOL DEDICATED TO EXECUTE DIFFERENT TYPES OF SUB-TASKS

BACKGROUND

Information services and data processing industries in general have rapidly expanded as a result of the need for computer systems to manage and store large amounts of data. As an example, financial service companies such as banks, mutual fund companies and the like now, more than ever before, require access to many hundreds of gigabytes or even terabytes of data and files stored in high capacity data storage systems. Other types of service companies have similar needs for data storage.

Data storage system developers have responded to the increased need for storage by integrating high capacity data storage systems, data communications devices (e.g., switches), and computer systems (e.g., host computers or servers) into so-called "storage networks" or "Storage Area Networks" (SANs.)

In general, a storage area network is a collection of data storage systems that are networked together via a switching fabric to a number of host computer systems operating as servers. The host computers access data stored in the data storage systems (of a respective storage area network) on behalf of client computers that request data from the data storage systems. For example, according to conventional applications, upon receiving a storage access request, a respective host computer in the storage area network accesses a large repository of storage through the switching fabric of the storage area network on behalf of the requesting client. Thus, via the host computer (e.g., server), a client has access to the shared storage system through the host computer. In many applications, storage area networks support hi-speed acquisitions of data so that the host servers are able to promptly retrieve and store data from the data storage system.

Conventional storage area network management applications typically include a graphical user interface (GUI) that enables a network manager to graphically manage, control, and configure various types of hardware and software resources associated with a corresponding managed storage area network. For example, one conventional storage management application generates a graphical user interface utilized by a storage administrator to graphically select, interact with, and manage local or remote devices and software processes associated with the storage area network.

Based on use of the graphical user interface in combination with an input device such as a hand operated mouse and corresponding pointer displayed on a viewing screen, a storage administrator is able to manage hardware and software entities such as file systems, databases, storage devices, volumes, peripherals, network data communications devices, etc., associated with the storage area network. For example, a network administrator can submit tasks for execution by a corresponding task processing environment. Submission of tasks for execution by a storage management station operating associated task execution software enables a storage administrator (a person responsible for managing the storage network) to retrieve, review, and manage information associated with a storage area network and its resources.

SUMMARY

Conventional storage area network management applications such as those as discussed above may suffer from a number of deficiencies. For example, the tasks associated with a storage area network can be carried out using multiple conventional processing threads that execute in parallel. However, special care must be taken to avoid a deadlock condition in which none of multiple processing threads are able to proceed to completion because two or more processes are each endlessly waiting for each other to release a resource needed to complete execution of a pending task.

Techniques discussed herein deviate with respect to conventional processing applications. For example, embodiments herein provide a novel and useful way for executing tasks via multiple pools of processing threads.

More specifically, according to one embodiment herein, a task management and execution system receives multiple tasks for execution. Prior to execution of the tasks, a task analyzer of the task management and execution system parses each of the tasks into different groupings sub-tasks (e.g., code). Each of the groupings is classified for execution by one of multiple pools of processing threads. For example, for each given received task, the task analyzer analyzes a given task (e.g., software code) to identify a first type of sub-tasks (e.g., groupings of code) associated with the given task as well as a second type of sub-tasks associated with the given task. The task management and execution system includes multiple pools of processing threads. One of the multiple pools of processing threads is dedicated for executing the first type of sub-tasks. Another pool of the multiple pools is dedicated for executing the second type of sub-tasks. Parsing of the sub-tasks into (or creating groupings of the sub-tasks for inclusion) different classes increases task execution efficiency.

In one embodiment, the task analyzer parses received tasks to identify a first type of sub-tasks including sub-tasks (or groupings of sub-tasks) that can be executed serially and/or tasks that generally can be executed in any order. Additionally, the task analyzer parses received tasks to identify a second type of sub-tasks including sub-tasks that are to be executed in parallel. In a specific embodiment, the first pool of processing threads can include a fixed number of processing threads for executing the first type of sub-tasks as the processing threads in the first pool are available. The second pool of processing threads can include a dynamic number of processing threads that automatically changes (e.g., increases or decreases) depending on a number of the second type of sub-tasks to be executed.

In another embodiment, a task analyzer according to embodiments herein can classify groupings of code based on different criteria than as mentioned above. For example, the task analyzer can parse the task (or tasks) to process the task to identify independent portions as well as dependent portions. The dependent portions of the task can include respective groupings of code that, when executed, depend on completion of other portions of the task in order to itself complete execution. Thus, dependent portions rely on execution of one or more other sub-tasks. The independent portions of the task can include respective groupings of code that, when executed, do not depend on completion of any other portions of the task in order to complete execution. An associated task manager submits the independent portions of the task (or tasks) for execution by a first pool of processing threads, which is dedicated to execute the independent portions of received tasks. Additionally, the task manager submits the dependent portions of the task (or tasks) for execution by a second pool of processing threads, which is dedicated to execute dependent portions of received tasks.

In yet other embodiments, the task analyzer parses each task into classes depending on a level where sub-tasks reside in a task execution strategy. As an example, the task execution strategy associated with a respective task can be a hierarchical tree including a main task at a root of the hierarchical tree. Nodes in the hierarchical tree at successively lower levels beneath the root node represent child sub-tasks. During the parsing process, the task analyzer classifies the root node (e.g., a main task associated with the task) for execution by a first pool of processing threads, the task analyzer classifies sub-tasks at a first level beneath the root node for execution by a second pool of processing threads, the task analyzer classifies sub-tasks at a second level beneath the root node for execution by a third pool of processing threads, and so on. Accordingly, each pool of processing threads executes different levels of sub-tasks. In one embodiment, each of the processing thread pools are fixed in number of processing threads. This prevents resource starvation in the system under heavy load.

Based on such techniques such as those as discussed above as well as those discussed below in the detailed description below, tasks and different portions of tasks can be more efficiently executed, without the threat of deadlock occurring and without the threat of overusing system resources.

These and other embodiments such as task management, pre-processing of tasks, maintaining status information of available processing threads, submission and execution of the sub-tasks by different pools of processing threads, etc. will be discussed later in this specification.

Note that embodiments disclosed herein include any type of computerized device, workstation, handheld or laptop computer, or the like configured with software and/or circuitry (e.g., a processor) to process any or all of the method operations disclosed herein. In other words, embodiments herein can include a computerized device such as a computer or storage area network manager or any type of processor that is programmed or configured to provide task management functions as explained herein.

Other embodiments disclosed herein include software programs to perform the steps and operations summarized above and disclosed in detail below. One such embodiment comprises a computer program product that has a computer-readable medium including computer program logic encoded thereon that, when performed in a computerized device having a coupling of a memory and a processor, programs the processor to perform any of the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained herein as embodiments disclosed herein.

In addition to the embodiments discussed above, other embodiments herein include a computerized device (e.g., a host computer, workstation, etc.) configured to support the techniques disclosed herein such as parsing of tasks and their execution. In such embodiments, a computer environment to carry out the invention includes a memory system, one or more processors (e.g., a processing devices), and an interconnect connecting the processor and the memory system. The memory system can be encoded with an application that, when executed on a respective processor, supports task processing (e.g., parsing and execution) according to techniques herein.

Yet other embodiments of the present disclosure include software programs to perform the method embodiment and operations summarized above and disclosed in detail below in the Detailed Description section of this disclosure. More specifically, one embodiment herein includes a computer program product (e.g., a computer-readable medium). The computer program product includes computer program logic (e.g., software instructions) encoded thereon. Such computer instructions can be executed on a computerized device to support task management and related functions according to embodiments herein. For example, the computer program logic, when executed on at least one processor associated with a computing system, causes the processor to perform the operations (e.g., the methods) indicated herein as embodiments of the present disclosure. Such arrangements as further disclosed herein can be provided as software, code and/or other data structures arranged or encoded on a computer readable medium such as an optical medium (e.g., CD-ROM), floppy or hard disk, or other medium such as firmware or microcode in one or more ROM or RAM or PROM chips or as an Application Specific Integrated Circuit (ASIC). The software or firmware or other such configurations can be installed on a computerized device to cause one or more processors in the computerized device to perform the techniques explained herein.

As an example, a more particular technique of the present disclosure is directed to a computer program product or computer environment that includes a computer readable medium having instructions stored thereon to facilitate execution of tasks and/or use of multiple pools of processing threads. The instructions and their corresponding execution support operations of: i) receiving a task; ii) analyzing the task to identify a first type of sub-tasks; iii) analyzing the task to identify a second type of sub-tasks to be executed in parallel; iv) via a first pool of processing threads dedicated to execute the first type of sub-tasks, executing the first type of sub-tasks based on availability of processing threads in the first pool; and v) via a second pool of processing threads dedicated to execute the second type of sub-tasks, executing the second type of sub-tasks in parallel.

Other embodiments of the present disclosure include hardware and/or software programs to perform any of the method embodiment steps and operations summarized above and disclosed in detail below.

It should be understood that the system disclosed herein may be embodied strictly as a software program, as software and hardware, or as hardware alone. The features disclosed herein may be employed in data communications devices, computer systems, etc. such as those manufactured by EMC, Inc., of Hopkinton, Mass.

Techniques herein are well suited for use in applications such as those supporting task management in a storage area network environment. However, it should be noted that configurations herein are not limited to such use and thus configurations herein and deviations thereof are well suited for use in other environments as well.

Each of the different features, techniques, configurations, etc. discussed herein can be executed independently or in combination. Accordingly, the present invention can be embodied and viewed in many different ways.

Also, note that this summary section herein does not specify every embodiment and/or incrementally novel aspect of the present disclosure or claimed invention. Instead, this summary only provides a preliminary discussion of different embodiments and corresponding points of novelty over conventional techniques. For additional details and/or possible perspectives (permutations) of the invention, the reader is directed to the Detailed Description section and corresponding figures of the present disclosure as further discussed below. Although not exhaustive, the claims section also provides different perspectives of the invention based on matter recited in the specification.

BRIEF DESCRIPTION OF THE DRAWINGS

The foregoing and other objects, features and advantages disclosed herein will be apparent from the following description of particular embodiments, as illustrated in the accompanying drawings in which like reference characters refer to the same parts throughout the different views. The drawings are not necessarily to scale, emphasis instead being placed upon illustrating the principles disclosed herein.

DETAILED DESCRIPTION

More specifically, according to one embodiment herein, a task management and execution system receives multiple tasks for execution. Prior to execution of the tasks, a task analyzer of the task management and execution system parses each of the tasks into different classes. For example, for each given received task, the task analyzer analyzes a given task (e.g., software code) to identify a first type of sub-tasks (e.g., groupings of code) associated with the given task as well as a second type of sub-tasks associated with the given task.

According to one embodiment, the task management and execution system includes multiple pools of processing threads. One of the multiple pools of processing threads is dedicated for executing the first type of sub-tasks, another pool of the multiple pools is dedicated for executing the second type of sub-tasks, and so on.

Parsing of the sub-tasks into different classes and execution of different classified portions of the tasks via different pools of processing threads increases an overall efficiency and flexibility of executing the tasks while keeping the use of system resources under control and, in certain embodiments, prevents occurrence of deadlock.

Figure 1:
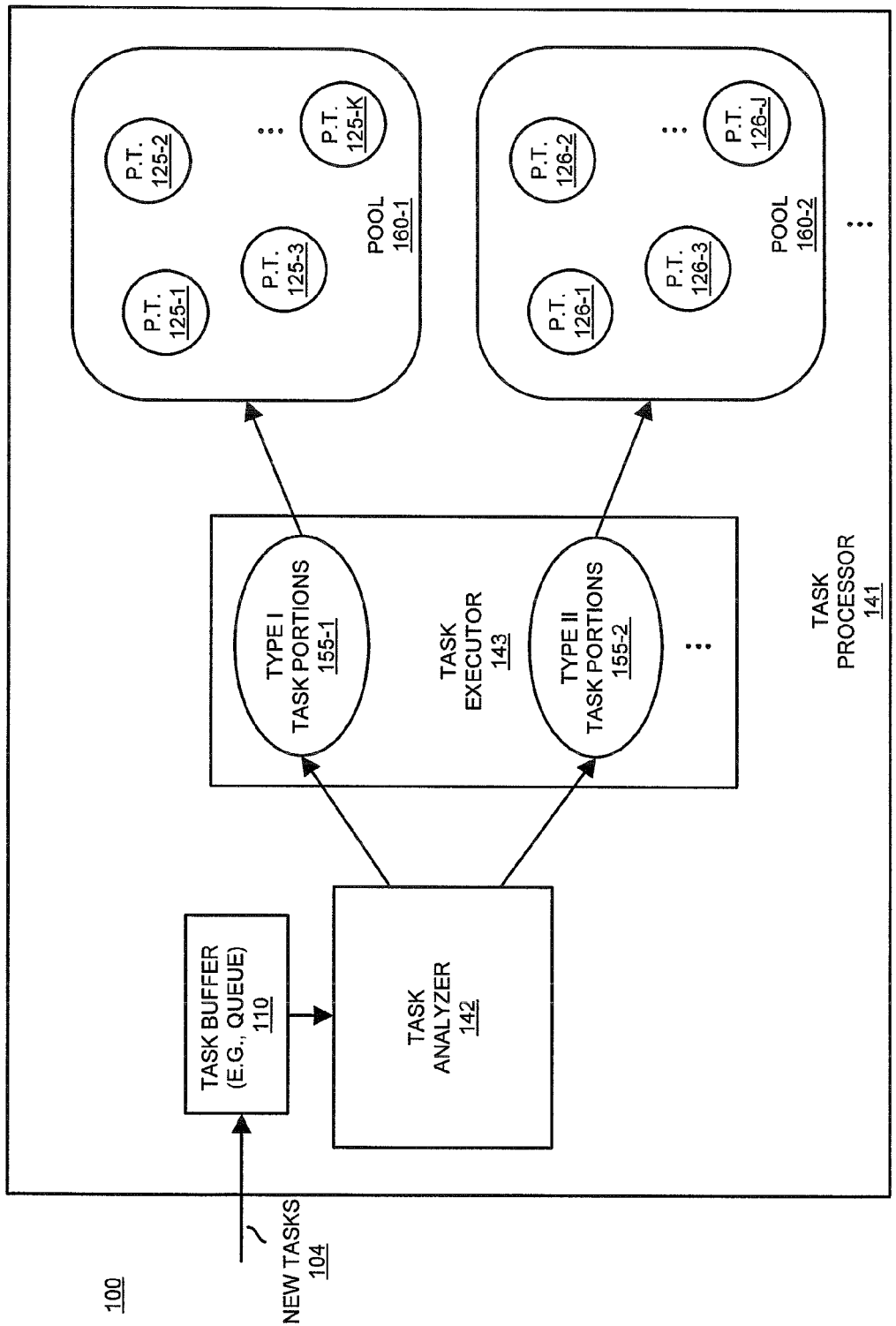
FIG. 1 is an example diagram illustrating an environment for processing and execution of tasks using different pool of processing threads according to embodiments herein.

Now, more specifically, FIG. 1 is an example diagram illustrating a task processing and execution environment according to embodiments herein. As shown, environment 100 includes a task buffer 110 (e.g., a queue) to store newly received tasks 104, a task analyzer 141 that classifies portions of the received tasks into different classes according to type, and a task executor 142 that submits the different classes of task portions to different respective pools 160 (e.g., pool 160-1 of processing threads 125, pool 160-2 of processing threads 126, . . . ). Pool 160-1 includes processing thread 125-1, processing thread 125-2, processing thread 125-3, . . . , processing thread 125-K. Pool 160-2 includes processing thread 126-1, processing thread 126-2, processing thread 126-3, . . . , processing thread 126-K.

As mentioned above, the task processor 141 can be configured to parse tasks and classify the respective sub-tasks (e.g., task portions, groupings of code, etc.) for inclusion in any number of two or more different types of classes such as type 1 task portions 155-1, type 2 task portions 155-2, etc. The task processor 141 (or related function) can maintain a respective pool of processing threads for executing each of the different classes of tasks portions.

As further discussed below, the task processor 141 can classify sub-tasks (e.g., types of task portions associated with respective tasks 104) in different ways. For example, depending on the embodiment, the received tasks 104 can be processed by task analyzer 142 to identify: i) parallel portions (e.g., parallel composite tasks) versus serial portions (e.g., serial composite tasks) for execution by different pools of processing threads, ii) dependent versus independent portions for execution by different pool of processing threads, iii) portions at different levels in a respective task execution strategy for execution by different pool of processing threads, etc.

Figure 2:
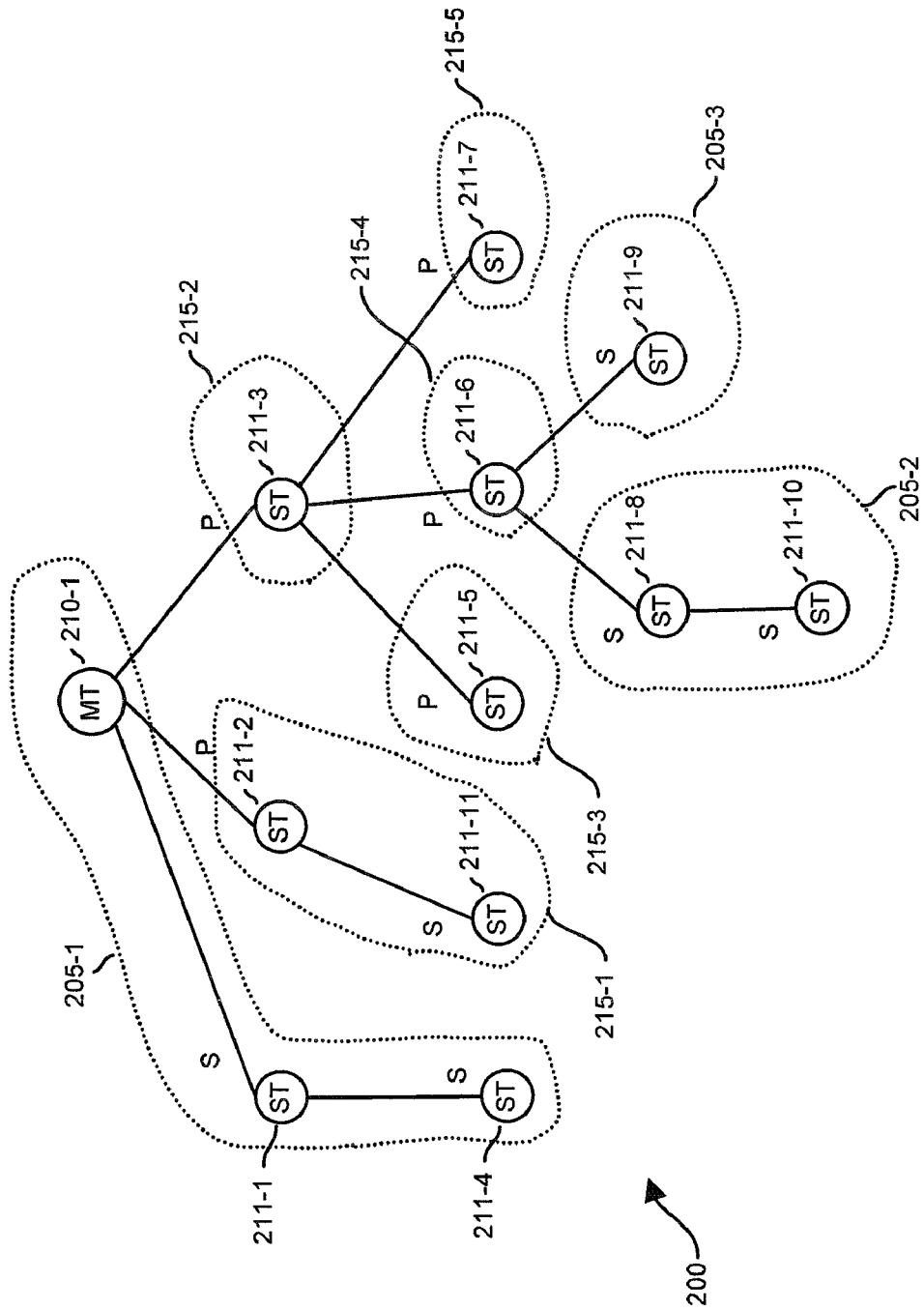
FIGS. 2, 3 and 4 are example diagrams illustrating groupings and classification of different sub-tasks according to embodiments herein.

FIG. 2 is an example diagram illustrating parsing of a respective task 200 into different classes according to embodiments herein. As shown, the task 200 includes a main task 210-1 (e.g., at the root node of the task execution strategy of respective task 200) as well as sub-tasks 211 beneath the main task 210-1. Sub-tasks 211 include sub-task 211-1, sub-task 211-2, sub-task 211-3, sub-task 211-4, sub-task 211-5, sub-task 211-6, sub-task 211-7, sub-task 211-8, and sub-task 211-9.

In general, as shown diagrammatically, the parent nodes in the respective hierarchical tree spawn respective sub-tasks. For example, when executed, main task 210-1 (e.g., the top-most parent in the task execution strategy) spawns execution of child sub-tasks including sub-task 211-1, sub-task 211-2, and sub-task 211-3. Sub-task 211-1 is both a parent and a child sub-task. When executed, sub-task 211-1 spawns execution of sub-task 211-4. Main task 210-1 also spawns execution of sub-task 211-2 and sub-task 211-3, which should be executed in parallel, and so on.

As its name suggests, the task analyzer 142 analyzes the task 200 to group and classify the different portions of the task 200 for execution by pools 160.

Note that rules for grouping and execution of the main tasks and sub-tasks by respective processing threads can vary depending on the embodiment. The groupings and classification below are merely one example of how to group and classify portions of code associated with a respective task.

In the context of the present example, the task analyzer 142 identifies the main task 210-1 at a root of the task hierarchy as well as identifies serial sub-tasks and parallel sub-tasks in the hierarchy beneath the main task 210-1. Based on whether the sub-tasks are marked or identified as being a serial (e.g., as identified by the letter S) or parallel task (e.g., as identified by the letter P), the task analyzer 142 initiates grouping of different portions of code associated with the task 200.

The different groupings of code (e.g., groups 205, groups 215) are designated for execution by different pools of processing threads. For example, according to one embodiment, the parallel sub-tasks are executed by processing threads in pool 160-2. The simple or serial composite sub-tasks (or groupings of sub-tasks) are to be executed by processing threads in pool 160-1.

As an example illustrating the classification process, the task analyzer 142 creates groups 205 (e.g., type 1 task portions such as group 205-1, group 205-2, and group 205-3) for execution by processing threads in pool 160-1. The task analyzer 142 creates groups 215 (e.g., type 2 task portions such as group 215-1, group 215-2, and group 215-3, group 215-4, and group 215-5) for execution by processing threads in pool 160-2.

More specifically, prior to execution of task 200, the task analyzer groups the main task 210-1, sub-task 211-1, and sub-task 211-4 as group 205-1 for execution by a single processing thread as a serial composite task because the sub-tasks 211-1 and 211-4 are marked as serial code. Recall that the letter 'S' next to sub-task 211-1 stands for 'serial' and indicates that sub-task 211-1 is a serial task spawned by the task 210-1 when executed. Sub-task 211-4 is a serial sub-task spawned by sub-task 211-1 when executed. Thus, the task analyzer 142 can group the main task 210-1, sub-task 211-1, and sub-task 211-4, all of which are part of a grouping 205-1 for execution by a respective processing thread in pool 160-1.

Note that task analyzer 142 creates group 205-2 to include sub-task 211-8 and sub-task 211-10 as well as creates group 205-3 to include sub-task 211-9. Each of groups 205 (e.g., group 205-1, 205-2, and 205-3) is classified in a class (e.g., type 1 class portions 155-1) of groups to be executed by respective processing threads in pool 160-1.

Additionally, during the classification process, the task analyzer 142 groups sub-task 211-2 and sub-task 211-11 into group 215-1 for execution by a single processing thread in pool 160-2. Both sub-task 211-2 and sub-task 211-3 are at the same level in the task execution strategy (e.g., hierarchical tree) and are marked as sub-tasks to be executed in parallel with each other. Thus, the task analyzer 142 creates group 215-2 to include sub-task 211-3.

Each of sub-tasks 211-11, sub-task 211-6, and sub-task 211-7 reside at the same level and are marked for parallel execution with each other. Accordingly, the task analyzer 142 creates a group out of each sub-task. For example, the task analyzer 142 creates group 215-3 to include sub-task 211-5, group 215-4 to include sub-task 211-6, and group 215-11 to include sub-task 211-7. In a manner as previously discussed, the task analyzer 142 classifies groups 215-3, group 215-4, and group 215-5 for execution by processing threads 126 in pool 160-2 because the corresponding code are designated as code or processes to be executed in parallel.

Figure 3:
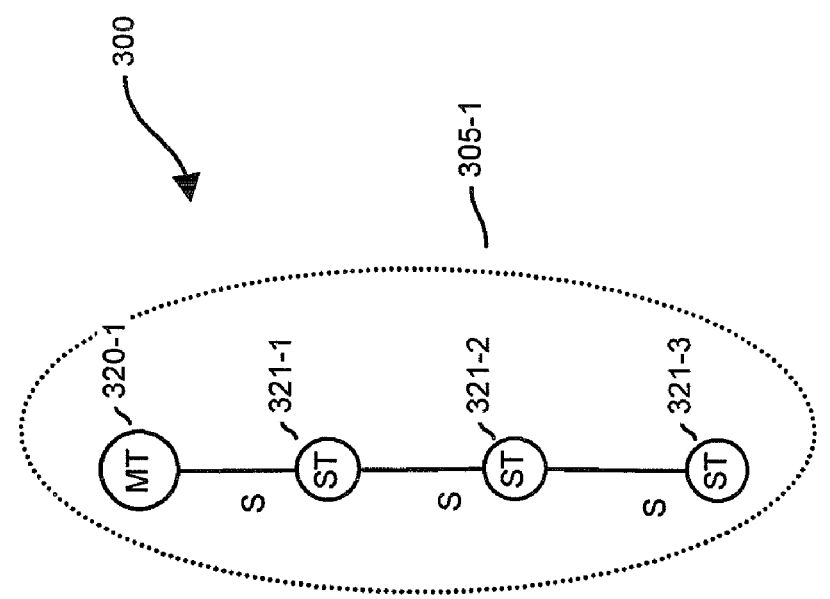

FIG. 3 is an example diagram illustrating a task 300 according to embodiments herein. As shown, task 300 includes main task 320-1, sub-task 321-1, sub-task 321-2, and sub-task 321-3. All of the sub-tasks 321 are designated as code to be executed serially rather than in parallel. Accordingly, the task analyzer 142 groups main task 320-1 and sub-tasks 321 into group 305-1 for execution by a single processing thread in pool 160-1.

Figure 4:
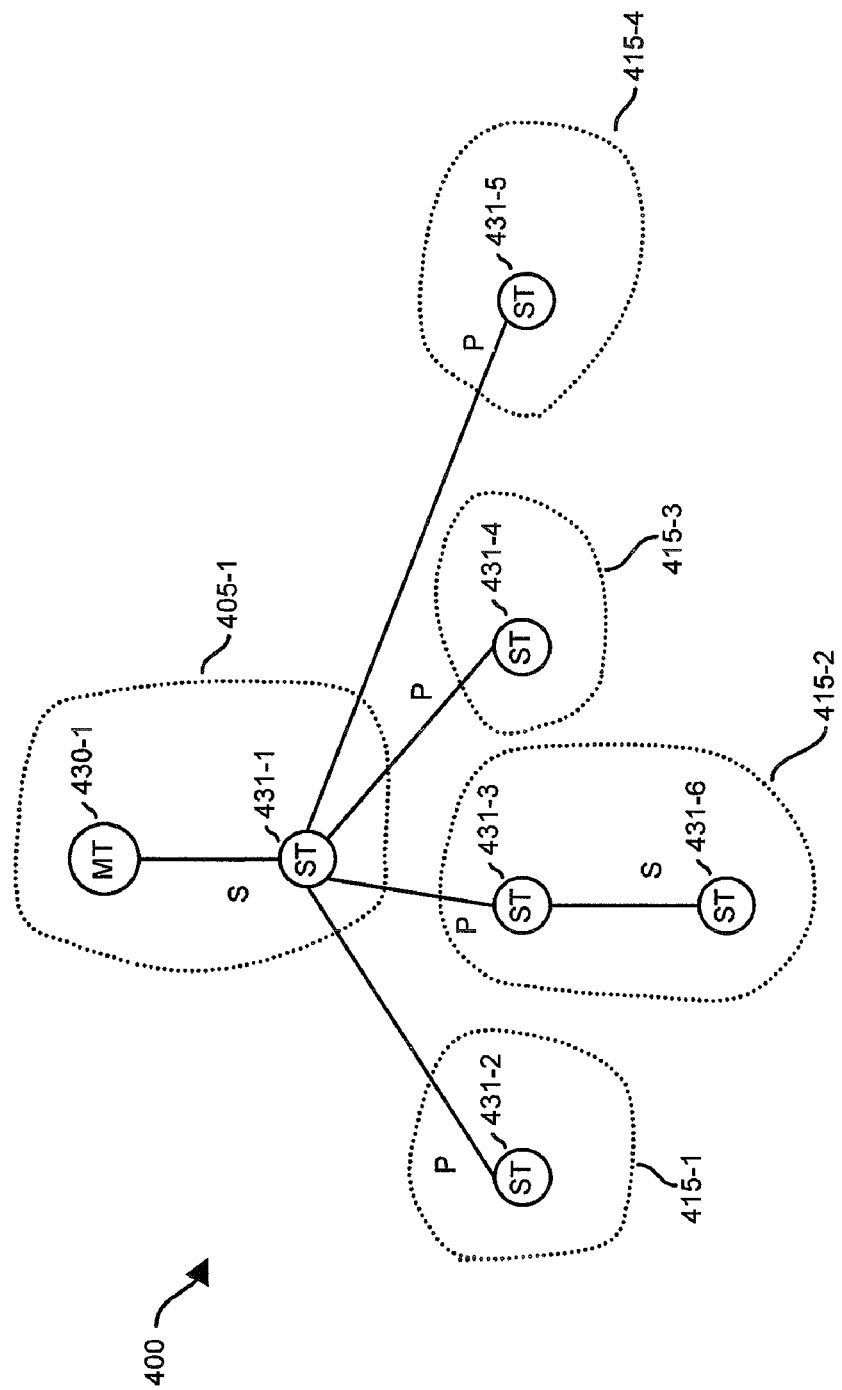

FIG. 4 is an example diagram illustrating a task 400 according to embodiments herein. As shown, task 400 includes main task 430-1, sub-task 431-1, sub-task 431-2, sub-task 431-3, sub-task 431-4, sub-task 431-5, and sub-task 431-6. In a similar vein as discussed above, the task analyzer 142 groups main task 430-1 and sub-task 431-1 into group 405-1. Group 405-1 can be executed at any time and need not be executed in parallel with other groups of code. Thus, group 405-1 is classified for execution by pool 160-1.

However, the task analyzer 142 identifies that each of sub-task 431-2, sub-task 431-3, sub-task 431-4, and sub-task 431-5 are to be executed in parallel. Sub-task 431-6 is marked for serial execution and thus can be executed along with sub-task 431-3. Accordingly, the task analyzer 142 according to embodiments herein creates group 415-1 to include sub-task 431-2. The task analyzer 142 creates group 415-2 to include sub-task 431-3 and sub-task 431-6. The task analyzer 142 creates group 415-3 to include sub-task 431-4. The task analyzer 142 creates group 415-4 to include sub-task 431-5. Groups 415 are classified for parallel execution by processing threads in pool 160-2.

Referring again to FIG. 1, after grouping and classifying respective portions of tasks as discussed above, the task executor 143 submits the tasks for execution by different pools 160 of processing threads depending on the embodiment as discussed below.

Embodiment #1

Create New Threads for Parallel Composite Tasks

To execute the tasks according to this embodiment, the task executor 143 uses the processing threads from pool 160-1 to execute simple tasks and serial composite tasks (e.g., group 205-1, group 205-2, group 205-3, etc.).

For parallel composite tasks (e.g., group 215-1 and 215-2), the task executor 143 creates a new processing thread in pool 160-2 for each parallel composite task so that parallel composite tasks can be executed immediately and in parallel. As processing threads in pool 160-2 complete a respective composite task, they are terminated (e.g., destroyed).

The advantage to such an embodiment is that the solution is relatively simple to implement. As discussed above, the number of processing threads in pool 160-2 changes over time based on need. Pool 160-2 can initially include no processing threads but increase in size as new processing threads are created.

Pool 160-1 may be a fixed size (e.g., include a fixed number of processing threads) as specified by a corresponding application, but depending upon the nature, complexity, and number of the submitted parallel tasks, additional threads will be created in pool 160-2 to handle the parallel composite tasks that require their own thread.

Embodiment #2

Multiple Pools, One Pool Reserved for Parallel Tasks

In this approach, the task processor 141 includes multiple pools including pool 160-1 and pool 160-2. Pool 160-1 is used exclusively for the execution of simple and serial composite tasks. Pool 160-2 is used for execution of parallel composite tasks.

According to this embodiment, processing threads in pool 160-1 need not be reserved in advance. Instead, the processing threads in pool 160-1 execute different task portions based on their availability (e.g., when they are free to execute tasks). However, the processing threads in pool 160-2 are reserved in advance of execution. For example, to avoid deadlock, the task executor 143 waits until there are enough free, unreserved processing threads in pool 160-2 before submitting an entire group of parallel composite tasks for parallel execution. Thus, depending on a current number of processing threads available in pool 160, the task executor may have to wait until there are enough unused or unreserved processing threads in pool 160-2 to initiate parallel execution of the parallel composite tasks.

This is a fairly straight-forward approach since processing thread resources are fixed at an exact value and created in advance. Such an approach mitigates a problem with starvation with respect to large tasks having many corresponding parallel composite tasks and serial composite tasks because such tasks can be executed immediately.

Embodiment #3

Two Thread Pools, One Unbounded

In this approach, multiple thread pools are used. Pool 160-1 of processing threads includes a fixed number of processing threads and is used exclusively for the execution of simple and serial composite tasks. Pool 160-2 includes a minimum number of processing threads and is an unbounded cached thread pool and is used for parallel composite tasks. For example, pool 160-2 can be configured to include at least 50 processing threads to execute composite parallel tasks. As more processing threads are needed, they can be temporarily created to execute the excess number of parallel composite tasks.

This solution is similar to the first approach above in which the thread pool for parallel composite tasks is essentially unbounded, but because a certain amount of threads always reside in the pool, the cost of creating new threads is minimized.

Embodiment #4

Dynamic Tasks

According to one embodiment, the ordering and number of sub-tasks associated with a respective task may change depending results obtained during execution of the task. For example, when the task processor 141 is used in a storage area network environment, a received task may include a sub-task that performs discovery of a particular storage array. Execution of the sub-task can entail finding any managed devices in a range of network addresses. It may not be known in advance how many managed devices will be found. After learning of a number of managed devices in the specified range, the task can be configured to initiate communications with each managed device to collect appropriate device information. Thus, a task can include a dynamic number of parallel composite or serial tasks.

To account for the possible dynamic nature of a task and the types of sub-tasks to be executed, the task analyzer 142 can be configured to classify and submit the dynamic task portions for execution. For example, if a task being executed has an additional set of parallel composite tasks (e.g., groupings of code) for execution, the task executor 143 submits the new portions of the task in accordance with the discussion above. For example, the new parallel composite task portions can be submitted immediately to pools that automatically create new processing threads. As alternative, the task executor 143 can submit the new parallel composite task portions when there are enough free, unreserved processing threads available to execute the new sub-tasks. In yet other embodiments such as those as discussed below in FIG. 5, the task executor 143 can submit new parallel composite tasks as processing threads become free.

Thus, embodiments herein include executing a received task via the processing threads in the first pool and the second pool. Based on executing the received via processing threads in the pool 160-1 and pool 160-2, the task analyzer 142 receives additional portions of the task for execution. In one embodiment, the task analyzer can be configured to analyze the additional portions of the currently executed task to identify additional portions of the first type. The task analyzer can also analyze the additional portions of the task to identify additional portions of the second type. Via use of the first pool of processing threads, the task processor 141 executes the additional portions (of the task) of the first type. Via the second pool of processing threads, the task processor 141 executes the additional portions of the second type.

Figure 5:
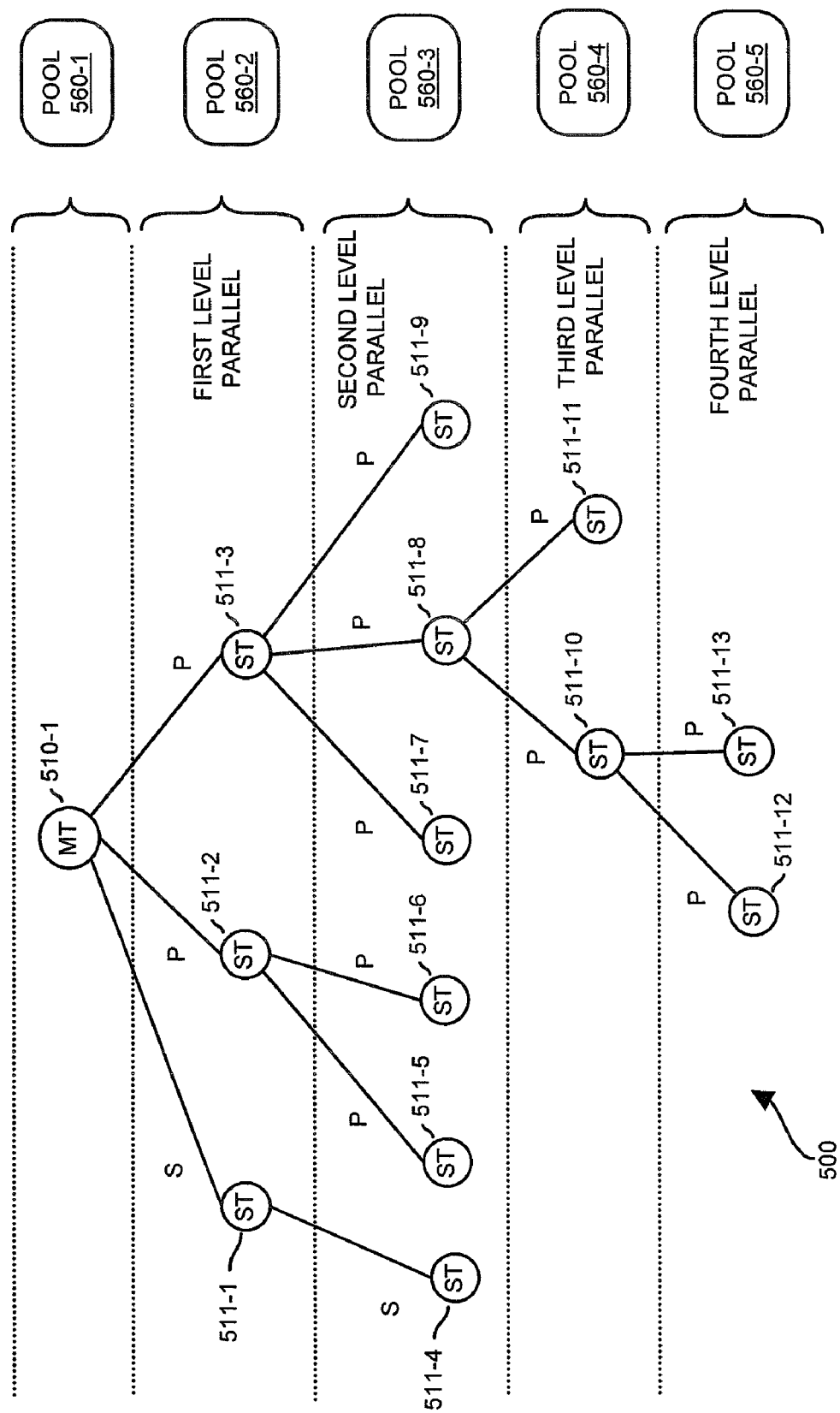
FIG. 5 is an example diagram illustrating classification of sub-tasks for execution by different pools of processing threads based on level of the sub-tasks in a hierarchical tree according to embodiments herein.

FIG. 5 is an example diagram illustrating use of multiple pools 560 of processing threads for execution of different levels of sub-tasks according to embodiments herein. As shown, task processor 141 maintains a respective one of multiple pools 560 for executing portions of tasks at different levels in the task execution strategy. Submitting tasks according to this embodiment can prevent thread starvation with respect to larger tasks that otherwise get pushed back in a queue until enough free processing threads are available for execution of the large task.

For example, according to one embodiment, pool 560-1 (of processing threads) is dedicated for executing simple tasks and serial composite tasks. An example of a serial composite task is a combination of main task 510-1, sub-task 511-1, and sub-task 511-4. A single processing thread in pool 560-1 can be used to execute this grouping of code.

For parallel composite tasks, the task processor 141 maintains a set of separate thread pools for execution of composite tasks at each level of the task hierarchy. For example, pool 560-2 can be maintained for execution of top-level parallel composite tasks (e.g., the highest level of parallel composite tasks nearest the root) such as sub-task 511-2 and sub-task 511-3. When free, one processing thread in pool 560-2 executes sub-task 511-2 while another processing thread executes sub-task 511-3. Depending on the embodiment, such sub-tasks can be executed simultaneously based on waiting for a group of free processing threads to execute the composite parallel tasks in parallel. Accordingly, the sub-task can be executed one after the other in a sequential manner depending on availability of processing threads.

Pool 560-3 can be maintained for execution of a next deeper level of parallel composite tasks such as sub-task 511-5 and sub-task 511-6 as well as sub-task 511-7, sub-task 511-8, and sub-task 511-9. Depending on availability, one processing thread in pool 560-3 can execute sub-task 511-5, another processing thread can execute sub-task 511-6, another processing thread can execute sub-task 511-7, and so on. As previously discussed, such sub-tasks at a given level in the hierarchy (e.g., task execution strategy) can be executed simultaneously (e.g., in parallel) or one after the other depending on availability of processing threads.

Pool 560-4 can be maintained for execution of a next deeper level of parallel composite tasks such as sub-task 511-10 and sub-task 511-11. In a similar vein as previously discussed, processing threads in pool 560-4 can execute sub-tasks 511-10 and sub-task 511-11 in a sequential manner based on availability.

Pool 560-5 can be maintained for execution of a yet next deeper level of parallel composite tasks such as sub-task 511-12 and sub-task 511-13.

Thus, according to embodiments herein, the task analyzer 142 can be configured to analyze task 500 and corresponding task execution strategy. The task execution strategy specifies different levels of parent sub-tasks associated with the received task to be executed in parallel via pool 560-2 as well as different groupings of corresponding child sub-tasks spawned by the parent sub-tasks to be executed in parallel via pool 560-3, and so on. As discussed above, to carry out execution, the task processor 141 utilizes pool 560-2 of processing threads to execute the parent sub-tasks at a first level in the task execution strategy, the task processor 141 utilizes pool 560-3 of processing threads to execute the corresponding child sub-tasks at a second level in the task execution strategy, and so on.

In a similar manner as discussed above for sample task 500, each of other multiple tasks received and processed by the task analyzer 142 can include different combinations of sub-tasks that are to be executed serially or in parallel. Depending on the depth of the parallel sub-tasks beneath a respective main task, the task executor 143 executes the parallel sub-tasks associated with the received tasks via use of the different pools 560.

Although the number of processing threads in each of pools 560 can be automatically created on an as-needed basis, another embodiment involves setting the number in each pool to be a predetermined value that does not change. In this latter embodiment, the parallel composite tasks are not necessarily executed in parallel but instead are executed on a first come first served basis at each different pool level. Eventually, as processing threads become free in the pools, the respective processing threads will be able to execute and free up different legs of the task. As the processing threads free up after completing execution of a respective leg of the task, the same processing threads can be used to execute other legs in the task execution strategy for a given task. Accordingly, a given task, regardless of size, can be submitted for immediately for execution without reserving any processing threads in advance or waiting for processing threads to become free. As processing threads become free, the groupings of code associated with the task will be executed.

As an example, assume that a processing thread in pool 560-1 executes main task 510-1 and sub-tasks 511-1 and 511-4. Assume further that pool 560-2 currently has only a single free processing thread. Such a processing thread is allocated for use by sub-task 511-2 to execute. Sub-task 511-3 thus cannot be executed immediately because there are no free processing threads in pool 560-2.

Execution of sub-task 511-2 spawns execution of sub-task 511-5 and sub-task 511-6. Suppose there is only one processing thread in pool 560-3 to execute sub-tasks 511-5 and 511-6. The task executor 143 utilizes the free processing thread to execute sub-task 511-5. Upon completion of sub-task 511-5, the task executor 143 allocates the newly freed processing thread in pool 560-3 to execute sub-task 511-6. Upon completion of sub-task 511-6, sub-task 511-2 is able to complete execution and free up a corresponding processing thread in pool 560-2.

The task executor 143 then utilizes the freed up processing thread in pool 560-2 to execute sub-task 511-3, which is awaiting execution. In a manner as discussed above, as processing threads in each of the pools 560 become available, the task executor 143 initiates execution of the sub-tasks. Based on this technique of traversing the different legs and utilizing free processing threads to execute the sub-tasks at different levels, there is no way for deadlock to occur because processing threads will eventually become free to execute all of the sub-tasks at different levels. Thus, completion of the task is guaranteed.

Figure 6:
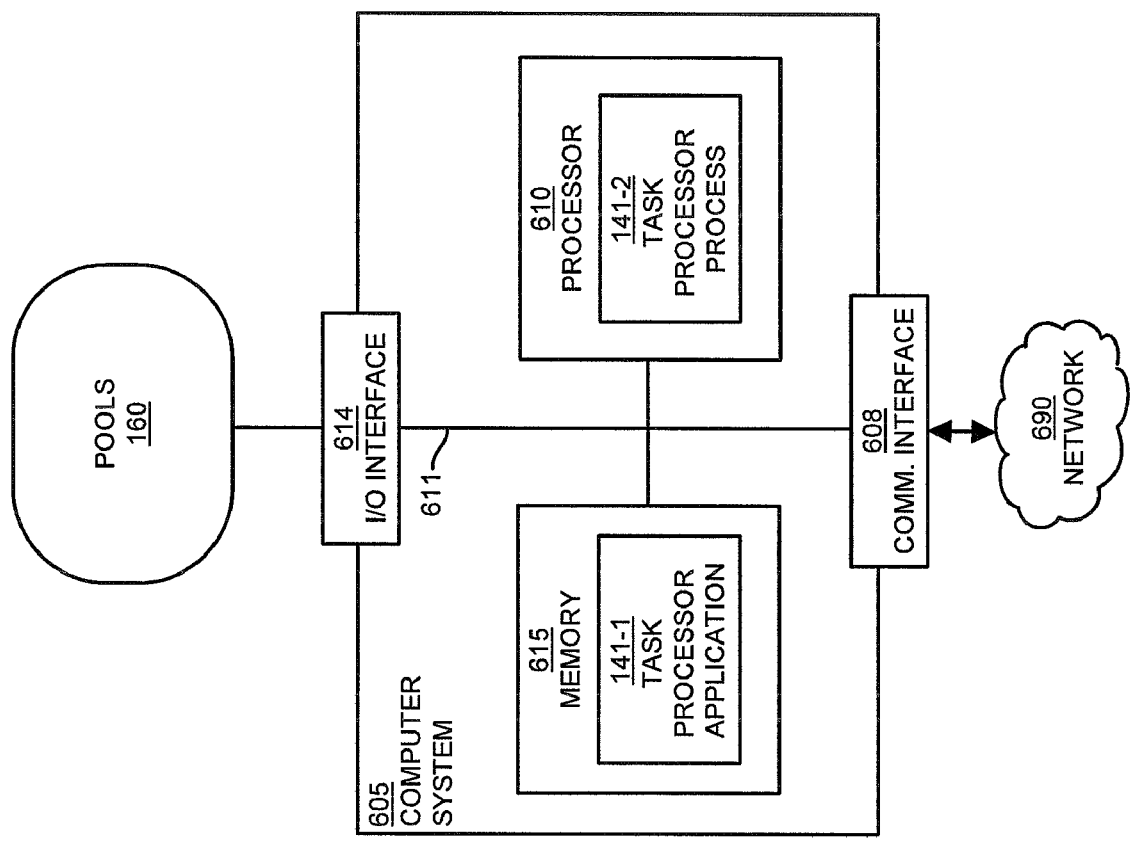
FIG. 6 is an example block diagram of a processing device suitable for executing a respective task analyzer and related functions according to embodiments herein.

FIG. 6 is a block diagram illustrating an example computer system 605 for executing task processor 141 and related functions/processes according to embodiments herein. Computer system 605 may be a computerized device such as a personal computer, workstation, portable computing device, console, network terminal, processing device, etc.

As shown, computer system 605 of the present example includes an interconnect 611 that couples a memory system 615, a processor 610, an I/O interface 614, and a communications interface 608. I/O interface 614 enables computer system 405 to submit tasks (or portions thereof) for execution by pools 160. Communications interface 614 enables computer system 405 to communicate over network 690 to transmit and receive information from different resources as is needed to carry out task processing according to embodiments herein.

As shown, memory system 615 is encoded with task processor application 141-1 supporting parsing and execution of tasks and other functions according to embodiments herein. Task processor application 141-1 can be embodied as software code such as data and/or logic instructions (e.g., code stored in the memory or on another computer readable medium such as a disk) that support functionality according to different embodiments described herein.

Note that other functionality associated with task processor 141 as described herein also can be encoded as software that operates on a computer system 605 to carry out embodiments herein.

Referring again to the task processor 141 example, during operation of task processor application 141-1, processor 610 accesses memory system 615 via the interconnect 611 in order to launch, run, execute, interpret or otherwise perform the logic instructions of the task processor application 141-1. Execution of the task processor application 141-1 produces processing functionality in task processor process 141-2. In other words, the task processor process 141-2 represents one or more portions of the task processor (or the entire application) performing within or upon the processor 610 in the computer system 605.

It should be noted that task processor process 141-2 executed in computer system 605 can be represented by either one or both of the task processor application 141-1 and/or the task processor process 141-2. For purposes of this discussion and different embodiments herein, general reference will again be made to the task processor 141 as performing or supporting the various steps and functional operations as previously discussed and as will be discussed further in this specification.

As mentioned, in addition to the task processor process 141-2, embodiments herein include the task processor application 141-1 itself (i.e., the un-executed or non-performing logic instructions and/or data). The task processor application 141-1 may be stored on a tangible computer readable medium such as a floppy disk, hard disk, or optical medium. The task processor application 141-1 may also be stored in a memory type system such as in firmware, read only memory (ROM), or, as in this example, as executable code within the memory system 615 (e.g., within Random Access Memory or RAM). In addition to these embodiments, it should also be noted that other embodiments herein include the execution of task processor application 141-1 in processor 610 as the task processor process 160-2. Thus, those skilled in the art will understand that the computer system 605 may include other processes and/or software and hardware components, such as an operating system that controls reservation and use of hardware resources.

Functionality supported by task processor 141 and other related task manager functions will now be discussed via flowcharts in FIGS. 7-10.

Figure 7:
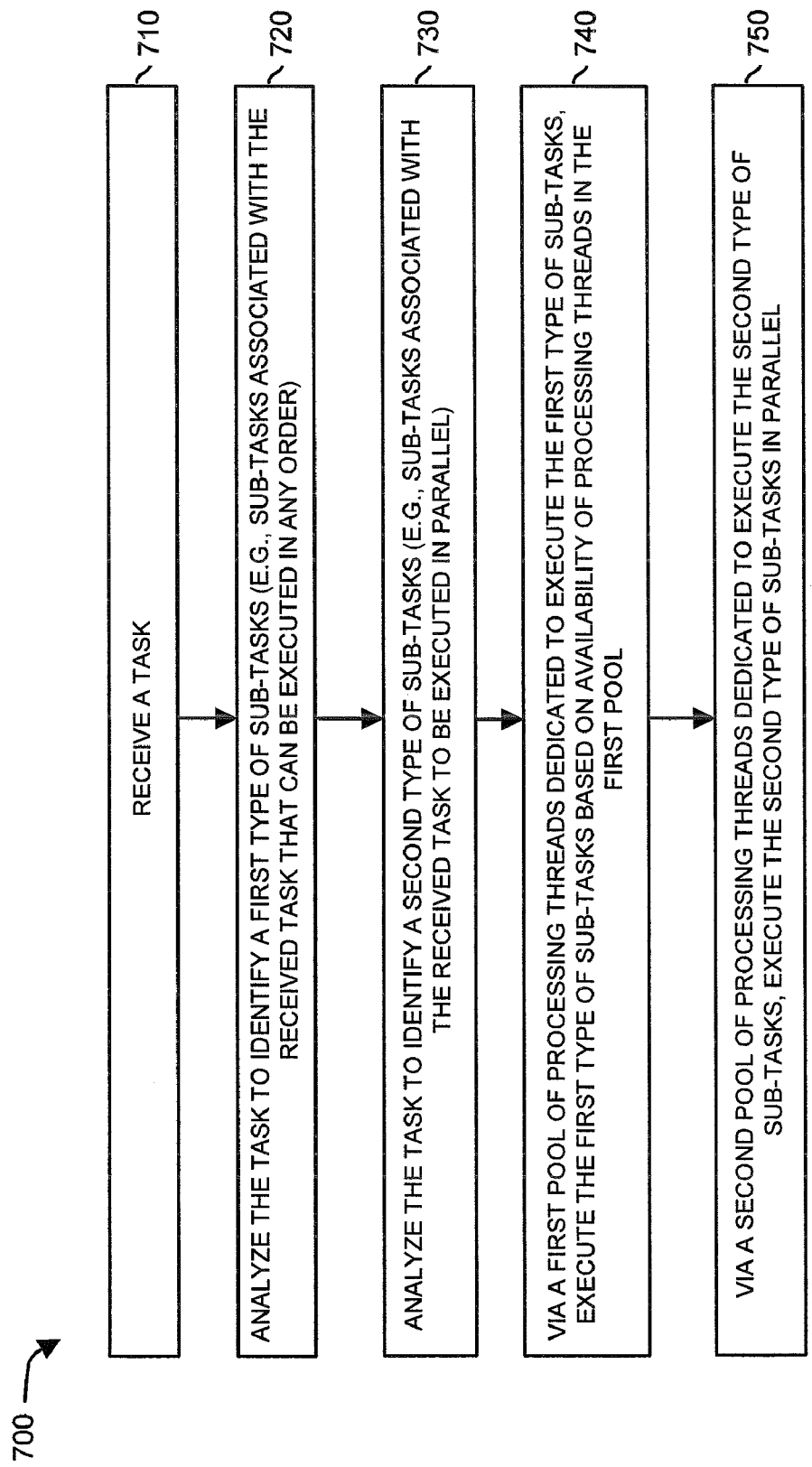
FIGS. 7-10 are example flowcharts illustrating task processing and execution according to embodiments herein.

Now, more particularly, FIG. 7 is a flowchart 700 illustrating a technique of task processing (e.g., task parsing, task execution, etc.) according to embodiments herein. Note that techniques discussed in flowchart 700 may overlap with the techniques discussed above.

In step 710, the task processor 141 receives a task 104.

In step 720, the task processor 141 analyzes the task 104 to identify sub-tasks of a first type for inclusion in task portions 155-1. In one embodiment, the first type of sub-tasks include simple sub-tasks and/or serial composite tasks associated with the received task that can be executed in any order.

In step 730, the task processor 141 analyzes the received task 104 to identify sub-tasks of a second type for inclusion in task portions 155-2. In one embodiment, the second type of sub-tasks include sub-tasks associated with the received task 104 that should be executed in parallel with each other.

In step 740, via a first pool 160-1 of processing threads 125 dedicated to execute the first type of sub-tasks, the task processor 141 executes the first type of sub-tasks based on availability of processing threads 125 in the first pool 160-1.

In step 750, via a second pool 160-2 of processing threads 126 dedicated to execute the second type of sub-tasks, the task processor 141 executes the second type of sub-tasks (e.g., parallel composite tasks) in parallel.

Figure 8:
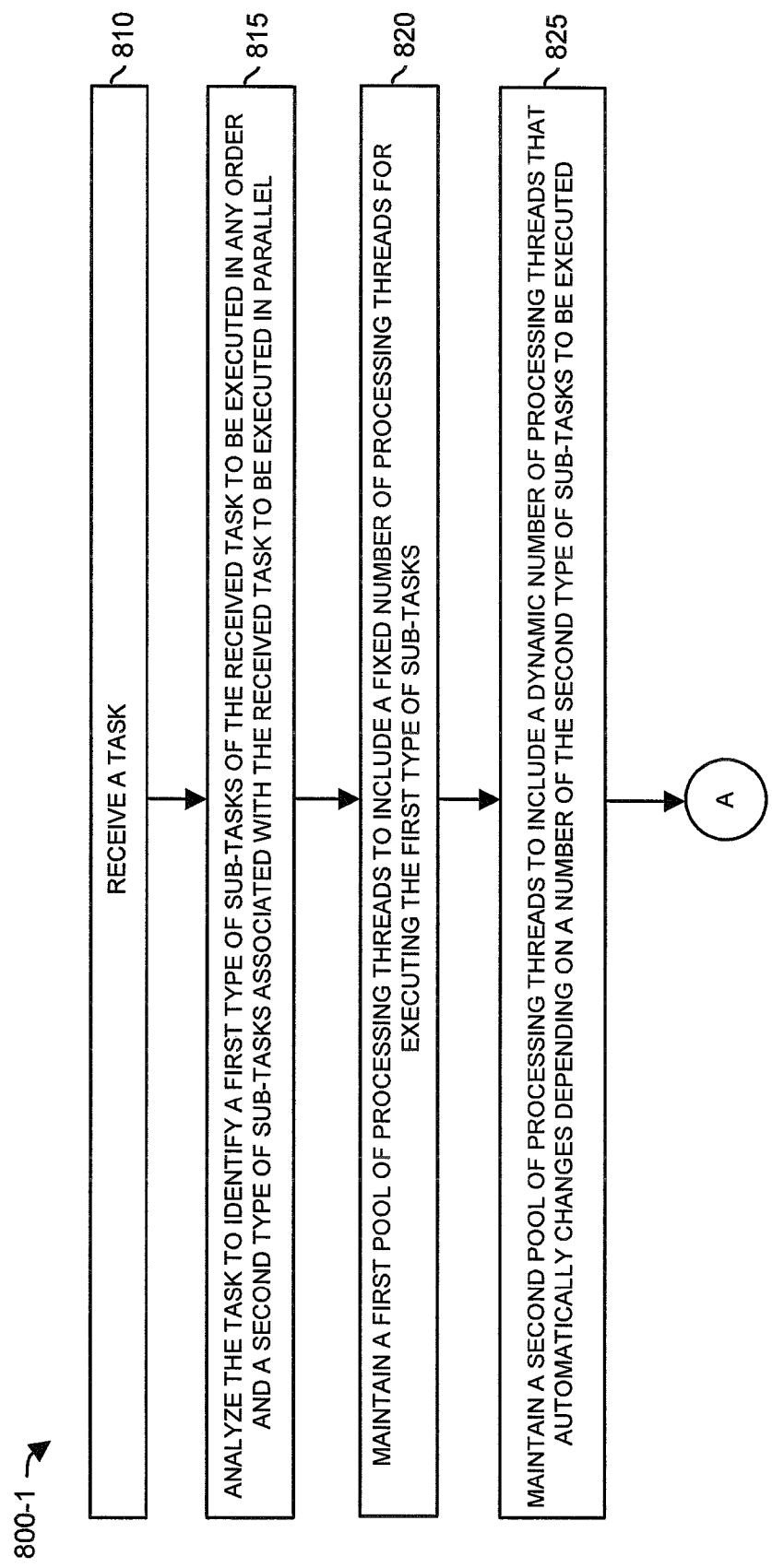
Figure 9:
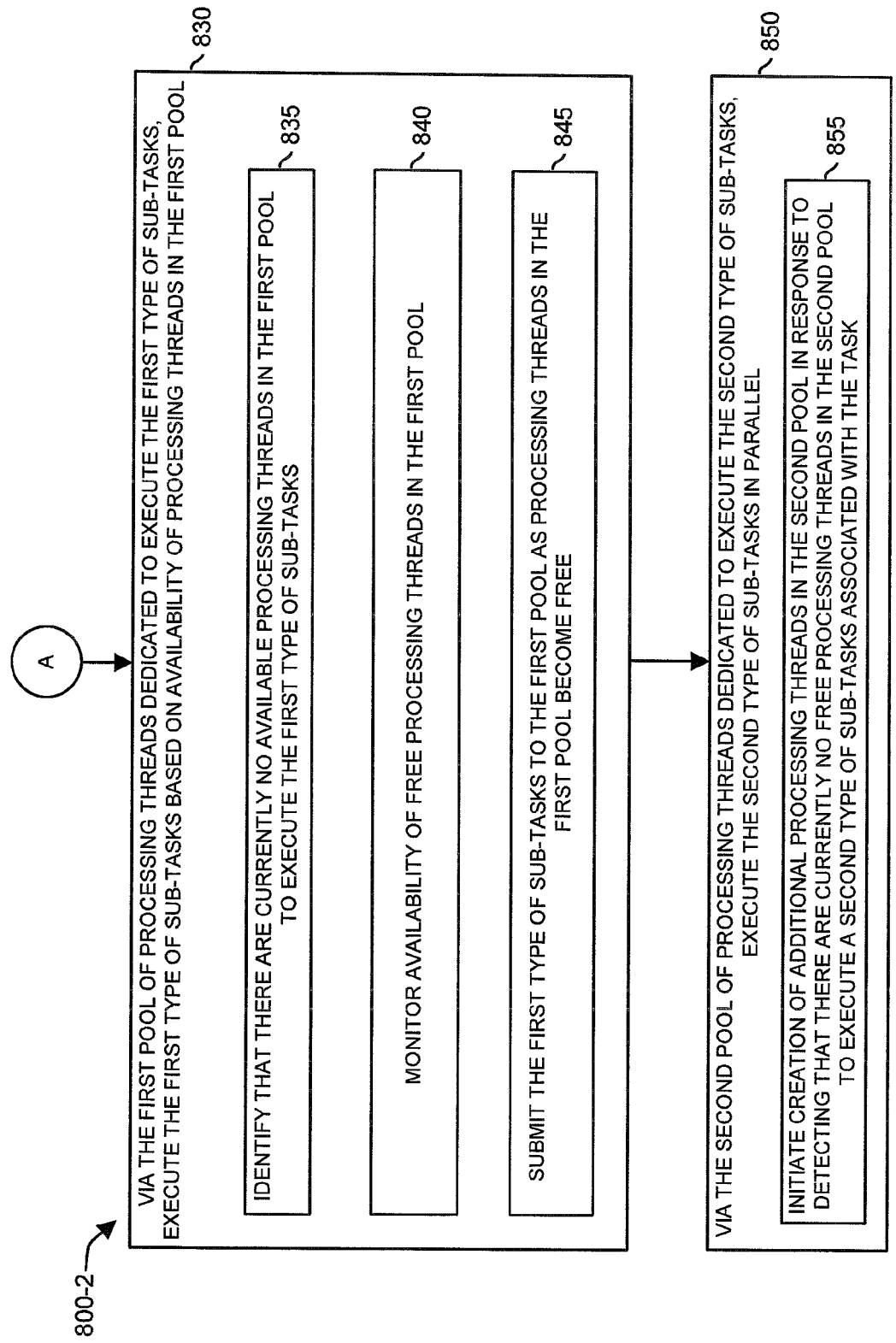

FIGS. 8 and 9 combine to form a detailed flowchart 800 (e.g., flowchart 800-1 and flowchart 800-2) illustrating techniques for task processing according to embodiments herein. Note that techniques discussed in flowchart 800 overlap with the techniques discussed above.

In step 810, the task processor 141 receives a task 104.

In step 815, the task processor 141 analyzes the task 104 to classify sub-tasks associated with the received task. For example, the task processor 141 identifies a first type of sub-tasks of the received task to be executed in any order. The task processor 141 also identifies a second type of sub-tasks associated with the received task to be executed in parallel.

In step 820, the task processor 141 maintains pool 160-1 of processing threads 125. The pool 160-1 of processing threads 125 can include a fixed number of processing threads for executing the first type of sub-tasks.

In step 825, the task processor 141 maintains pool 160-2 of processing threads 126. The pool 160-2 can include a dynamic number of processing threads 126 that automatically changes depending on a number of the second type of sub-tasks to be executed in parallel and how many of processing threads 126 are currently free to execute respective sub-tasks associated with task 104.

In step 830 (of FIG. 9), via the pool 160-1 of processing threads dedicated to execute the first type of sub-tasks, the task processor 141 initiates execution of the first type of sub-tasks based on availability of processing threads 125 in pool 160-1.

In step 835 associated with step 830, if all processing threads 125 are currently used, the task processor 141 identifies that there are currently no available processing threads in the first pool 160-1 to execute the first type of sub-tasks associated with task 104.

In step 840 associated with step 830, the task processor 141 monitors the availability of free processing threads in the first pool 160-1.

In step 845 associated with step 830, the task processor 141 submits the first type of sub-tasks to the first pool 160-1 as processing threads 125 in the first pool 160-1 become free.

In one embodiment as mentioned above in step 840 and step 845, the task processor 141 can monitor the availability of free processing threads to identify when processing threads in the second pool complete execution of corresponding assigned tasks. When there are enough free processing threads in the second pool to execute all of the first type of sub-tasks (e.g., at a particular level of the task execution strategy or at all levels of the task execution strategy) associated with a given task to be executed, task processor 141 submits all of the first type of sub-tasks associated with a given task to the appropriate pool for execution. In response to submitting all of a first type of sub-tasks associated with the given task to the appropriate pool for execution, the task processor 141 reserves a number of processing threads in the first pool equal to a number of sub-tasks in the first pool.

Reserving the processing threads means that the task processor 141 will not submit another sub-task for execution by the reserved processing threads until receiving notification that the respective reserved processing threads become free.

As reserved processing threads in the pool free up as a result of completing execution of corresponding sub-tasks associated with the given task being executed, the task processor 141 maintains the freed up processing threads as being available for executing other tasks. More details about reserving processing threads for use by other tasks is discussed in related U.S. patent application entitled "TASK MANAGEMENT USING MULTIPLE PROCESSING THREADS," Ser. No. 11/863,018, filed on the same date as the present application, the entire teachings of which are incorporated herein by this reference.

In step 850, via the second pool 160-2 of processing threads dedicated to execute the second type of sub-tasks, the task processor 141 executes the second type of sub-tasks in parallel.

In sub-step 855 associated with step 850, the task processor 141 initiates creation of additional processing threads in the second pool 160-2 in response to detecting that there are currently no free processing threads in the second pool 160-2 to execute all of the second type of sub-tasks to be executed in parallel.

Figure 10:
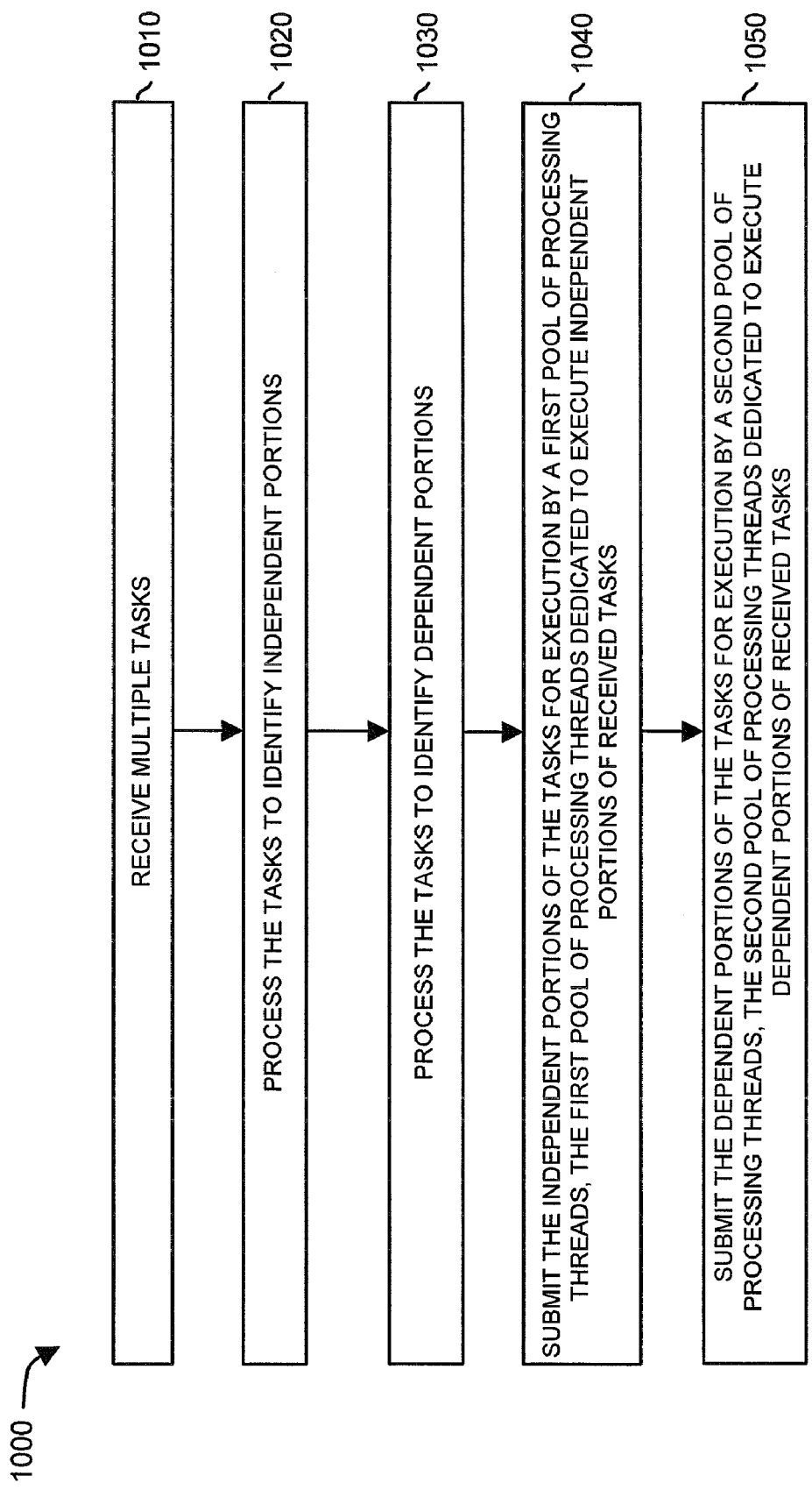
Figure 11A:
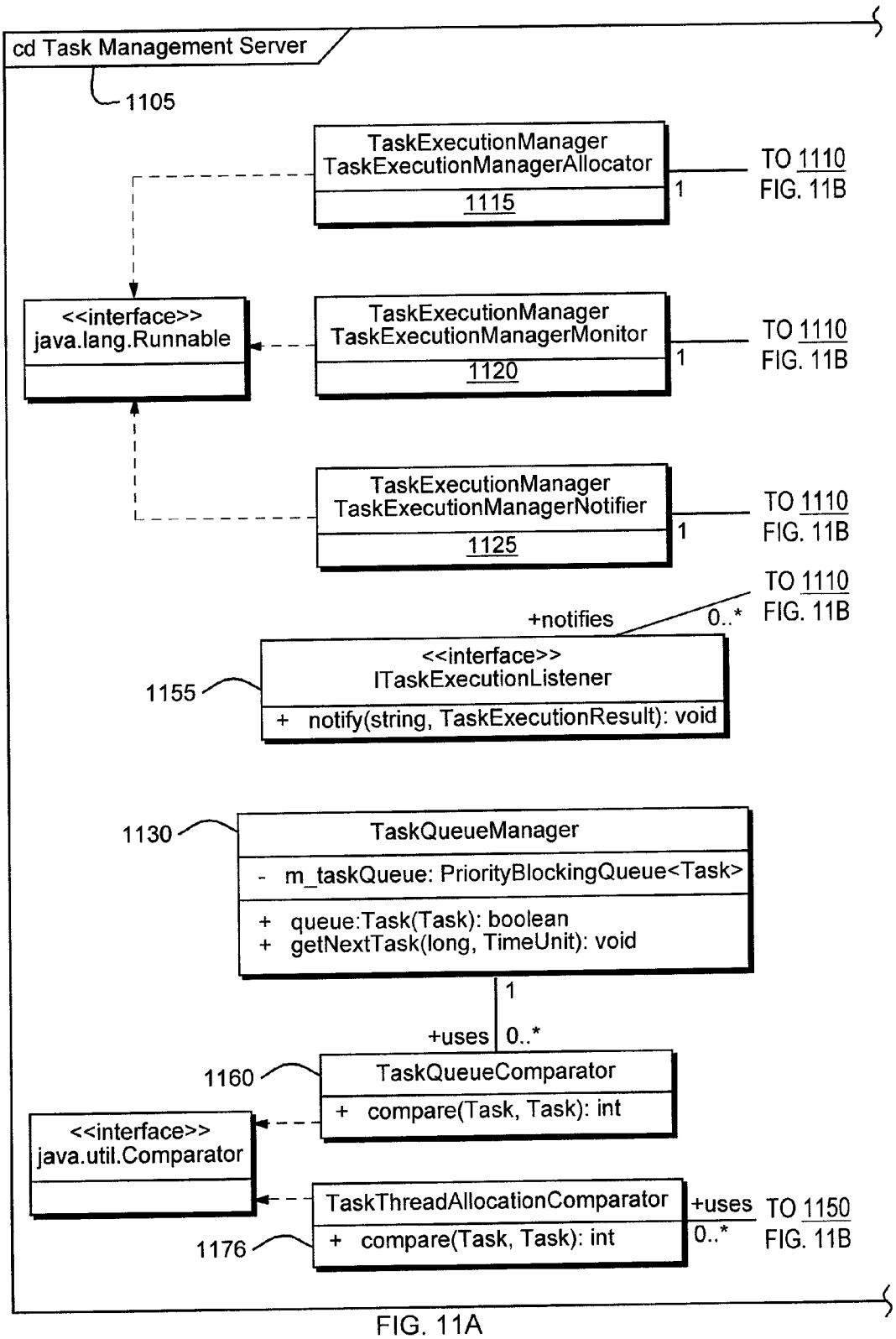
FIGS. 11A, 11B, 11C and 11D combine to form an example diagram of a task management server according to embodiments herein.
Figure 11B:
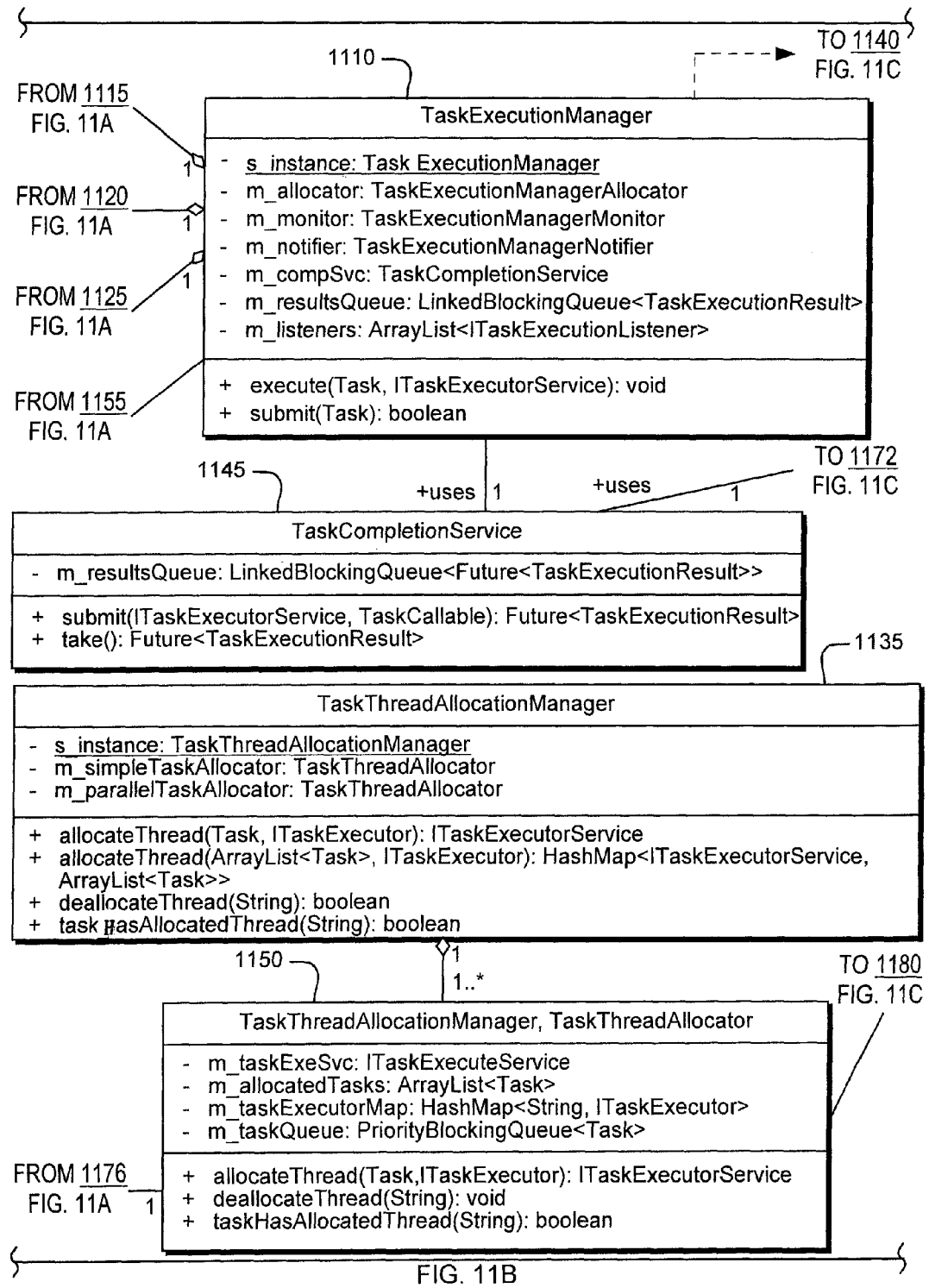
Figure 11C:
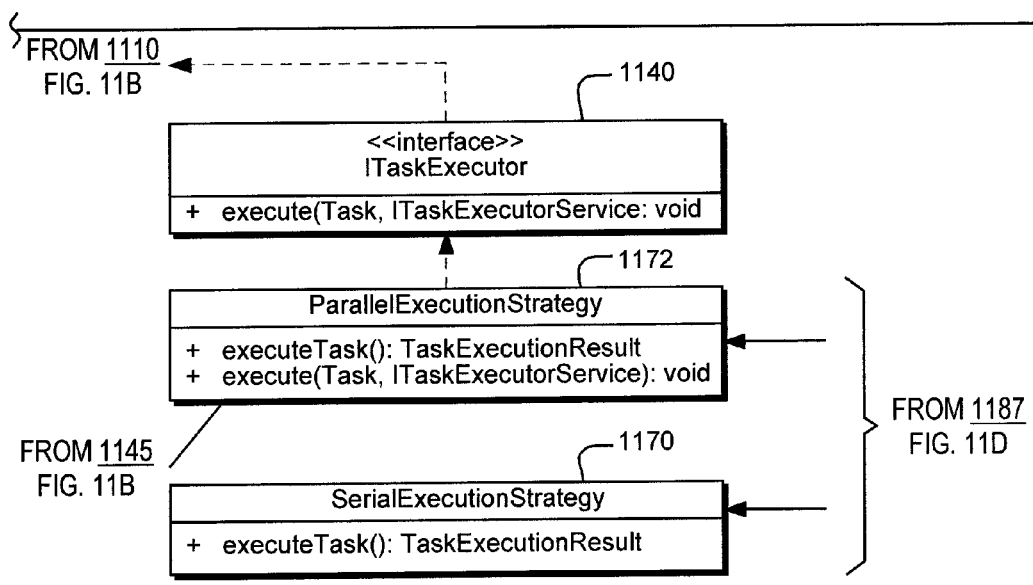
Figure 11C:
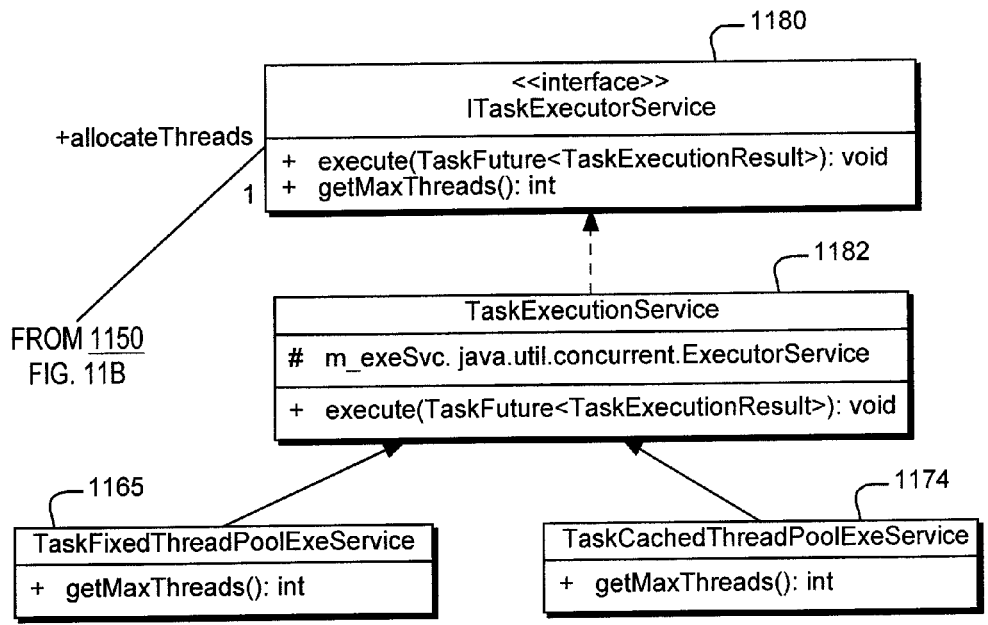
Figure 11D:
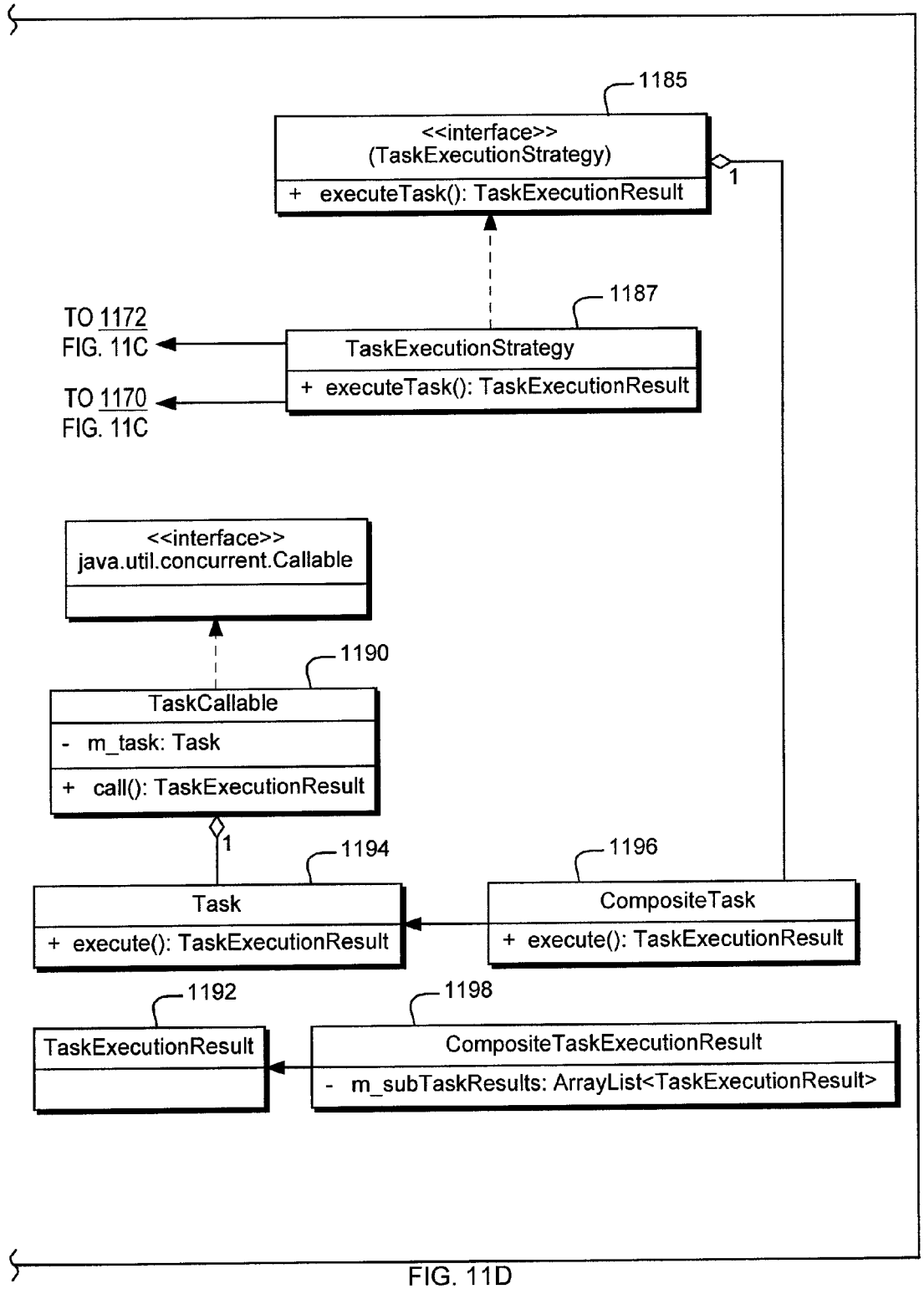

FIG. 10 is a detailed flowchart 1000 illustrating task execution and task management according to embodiments herein. Note that techniques discussed in flowchart 1000 overlap with the techniques discussed above in the previous figures.

In step 1010, the task analyzer 141 receives multiple tasks 104.

In step 1020, the task analyzer 141 processes the tasks 104 to identify respective independent portions (e.g., groupings of code). In one embodiment, identifying independent portions of a task includes identifying a set of independent groupings of code associated with the task for execution by a first pool of processing threads. Each of the independent groupings of code, when executed, are able to complete execution independently of other portions of the task completing execution. In other words, the independent portions do not rely on completion of execution of other groupings of code.

In step 1030, the task analyzer 141 also processes the tasks 104 to identify dependent portions (e.g., groupings of code). In one embodiment, identifying dependent portions of a respective task includes identifying a set of dependent groupings of software code associated with the task for execution by a second pool of processing threads. Each group of the dependent groupings of code (e.g., dependent portions), when executed, depend on completion of other portions of the task in order for themselves to complete execution In step 1040, the task analyzer 141 submits the independent portions of the tasks 104 for execution by a first corresponding pool (e.g., pool 160-1) of processing threads. As previously discussed, the first corresponding pool of processing threads can be dedicated to execute independent portions of received tasks 104.

In step 1050, the task analyzer 141 submits the dependent portions of the tasks 104 for execution by a second corresponding pool of processing threads. As discussed above, the second pool of processing threads can be dedicated to execute dependent portions of received tasks 104.

Another Example Embodiment

FIGS. 11A, 11B, 11C and 11D are an example diagram illustrating a task management service 1105 according to embodiments herein. As previously discussed, a task management and execution system can include multiple pools of processing threads including one pool having a fixed number of processing threads as well as another pool having a unbounded number of processing threads. According to such an embodiment, there is no need that threads be reserved in advance to ensure that dead-lock does not occur due to a lack of thread resources because any required new threads can be created on an as-needed basis. Because threads no longer need to be reserved in advance of task execution, the issues surrounding the support for dynamic CompositeTasks and thread starvation are eliminated.

A dual thread pool system is used in which one of the thread pools is not bounded. Parallel CompositeTasks are executed by processing threads in the unbounded thread pool. This includes all top-level parallel CompositeTasks and also subtasks of CompositeTasks that are themselves parallel CompositeTasks. Because a new thread is always available in this thread pool (because processing threads are dynamically created on an as-needed basis), dead-lock is not possible. As a consequence of using an unbounded threadpool, the number of thread resources used by the Task Management Service is no longer absolutely fixed in size. However, only parallel CompositeTasks requiring a new thread are executed on the unbounded thread pool. In addition, threads on the unbounded thread pool are cached and reused, while threads that remain idle for an extended period of time are terminated and destroyed. This ensures that thread resources above and beyond those utilized by the fixed-sized thread pool are minimized, while still ensuring a dead-lock free system.

Classes and Interfaces

This following text describes the classes and interfaces and how they interact to execute tasks in the Task Manager Service. The class diagram is for this embodiment is shown in FIGS. 11A, 11B, 11C and 11D.

TaskExecutionManager

The TaskExecutionManager 1110 is the entry point into the Task execution engine of the Task Management Service 1105. In one embodiment, the TaskExecutionManager 1110 is a singleton class, and it defines three private classes: TaskExecutionManagerAllocator 1115, TaskExecutionManagerMonitor 1120, and TaskExecutionManagerNotifier 1130, each of which implements the java.lang.Runnable interface. When the TaskExecutionManager 1110 is instantiated, it creates an instance of these private classes and starts each of them in their own thread. The following is a brief description of the purpose of each of these private classes of the TaskExecutionManager 1110.

TaskExecutionManagerAllocator 1115—The allocator 115 continuously queries the TaskQueueManager 1130 via the getNextTask( ) method for the next Task to be executed. When a Task is ready to be executed, the allocator 1115 requests threads for the Task from the TaskThreadAllocationManager 1135 via the allocateThread( ) method, passing the Task and also the TaskExecutionManager 1110, which implements the ITaskExecutor interface 1140.

TaskExecutionManagerMonitor 1120—The monitor 1120 continuously queries the TaskCompletionService 1145 used by the TaskExecutionManager 1110 via the take( ) method for Tasks that have completed execution. When a Task completes, the monitor 1120 deallocates the thread used for that Task via the TaskThreadAllocationManager 1150 deallocateThread( ) method. It also places the TaskExecutionResult on the TaskExecutionManager's results queue.

TaskExecutionManagerNotifier 1125—The notifier 1125 continuously monitors the results queue for Tasks that have completed execution. When a TaskExecutionResult is available, the notifier 1125 informs any registered ITaskExecutionListeners 1155 of the completed Task, passing the TaskExecutionResult.

ItaskExecutionListener 1155

Classes that implement the ITaskExecutionListener interface 1155 are notified by the TaskExecutionManager 110 when Tasks executed by the Task Management Service 1105 completes execution. ITaskExecutionListener 1155 instances may be registered with the TaskExecutionManager 1110. Whenever a Task completes, all registered listeners 1155 are notified.

TaskQueueManager 1110

Tasks that are submitted to the Task Management Service 1105 for execution are placed on a Task queue managed by the TaskQueueManager 1130. The TaskQueueManager 1130 is responsible for making sure that the Tasks are queued in the proper order so that they executed in the proper order. It does this by placing the Tasks on a PriorityBlockingQueue, which uses the TaskQueueComparator 1160 class to determine the ordering of tasks added to the queue.

TaskQueueComparator 1160

The TaskQueueComparator 1160 class implements the Java Comparable interface for instances of class Task. It is used by the TaskQueueManager 1130 to order the Tasks in its queue. The TaskQueueComparator 1160 determines order based on TaskPriority. If two Tasks have the same TaskPriority, then the Task submission time is used. The submission time is the time that the Task was submitted to the Task Management Service for execution and placed on the TaskQueueManager 1130 Task queue.

TaskThreadAllocationManager 1150

The TaskThreadAllocationManager 1150 is responsible for managing the allocation and deallocation of thread resources to and from Tasks. The TaskThreadAllocationManager 1150 is a singleton class. It defines a private, internal class TaskThreadAllocator 1135. When the TaskThreadAllocationManager 1135 is created it creates two instances of TaskThreadAllocator 1135. It also creates an instance of TaskFixedThreadPoolExeService 1165 and an instance of TaskCachedThreadPoolExeService. It assigns the fixed-size thread pool service to one TaskThreadAllocator 1135 and the cached thread pool service to the other. When a thread is requested for a Task, the TaskThreadAllocationManager 1150 examines the type of the Task. Depending on the type, the allocation request is delegated to one of the two TaskThreadAllocators, which is responsible for managing the allocation of the threads on its associated ITaskExecutorService.

Simple Tasks and CompositeTasks with SerialExecutionStrategy 1170 are allocated threads on the TaskThreadAllocator with the TaskFixedThreadPoolExeService 1165, while CompositeTasks with ParallelExecutionStrategy 1172 are allocated threads on the TaskThreadAllocator with the TaskCachedThreadPoolExeService 1174.

TaskThreadAllocationComparator 1176

The TaskThreadAllocationComparator 1176 class implements the Java Comparable interface for instances of class Task. It is used by the TaskThreadAllocator 1135 to order the Tasks in its queue. When a thread is requested for a Task and a thread is not immediately available, the Task is placed on the Task queue. When a thread is subsequently deallocated, the first Task in the queue is allocated the thread. The TaskThreadAllocationComparator 1176 determines order based on the assumptions described previously in Assumptions for a New Thread Management Strategy.

TaskCompletionService 1145

A TaskCompletionService 1145 is used to execute Tasks and wait for their completion. A TaskCompletionService 1145 can execute any number of Tasks. Also, it can execute them on any number of independent ITaskExecutorService 1180 instances. The results of all executed Tasks are placed on the results queue of the TaskCompletionService 1145, which is a blocking queue. User's of a TaskCompletionService 1145 submit Tasks for execution and wait for their completion by waiting on the results queue until they have gotten the results of their submitted Tasks. The TaskExecutionManager 1110 uses a TaskCompletionService 1145 to execute top-level Tasks submitted to the Task Management Service for execution. The ParallelExecutionStrategy 1172 uses a TaskCompletionService 1145 to execute the subtasks of a CompositeTask.

ItaskExecutor 1140

The ITaskExecutor 1140 interface defines the callback interface for classes that request threads from the TaskThreadAllocationManager 1176. When a thread is requested from the TaskThreadAllocationManager 1176, an ITaskExecutor 1140 is passed. When a thread is available for the Task, the ITaskExecutor 1140 is notified so that the Task can be executed. TaskExecutionManager 1110 and ParallelExecutionStrategy 1172 implement ITaskExecutor 1140 as they need to request threads from the TaskThreadAllocationManager 1150 and will execute the Tasks when the threads become available.

ITaskExecutorService 1180

ITaskExecutorService 1180 defines the interface for a TaskExecutorService 1182. A TaskExecutorService 1182 is essentially a wrapper around a Java 5 ExecutorService. By wrapping the Java 5 ExecutorService, we don't expose the underlying implementation and make it easy to bypass the TaskThreadAllocationManager 1176 and execute Tasks at will.

TaskExecutorService 1182

The TaskExecutorService 1182 is an abstract base class. It provides the implementation of the execute( ) method for all TaskExecutorService 1182 instances, but does not define a specific underlying Java 5 Executor Service. It therefore cannot define the maximum number of threads available in the Java 5 implementation.

TaskFixedThreadPoolExeService 1165

The TaskFixedThreadPoolExeService 1165 is a TaskExecutorService 1182 that uses an underlying Java 5 Fixed-Size ThreadPoolExecutor as its ExecutorService. The size of the thread pool is configurable and currently defaults to 100. Because the thread pool is fixed in size, this TaskExecutorService 1182 can execute at most that number of Tasks simultaneously. Additional Tasks have to wait for a Task to complete before they can execute.

TaskCachedThreadPoolExeService 1174

The TaskCachedThreadPoolExeService 1174 is a TaskExecutorService 1182 that uses an underlying Java 5 Cached ThreadPoolExecutor as its ExecutorService. The thread pool has no initial size, but the maximum size is unbounded. The cached ThreadPoolExecutor creates threads as necessary and reuses threads that are idle. If threads remain idle for too long, they are garbage collected so that the resources consumed by the threads are returned to the system.

ItaskExecutionStrategy 1185

ITaskExecutionStrategy 1185 defines the interface for execution strategies associated with CompositeTasks. The ITaskExecutionStrategy 1185 for a CompositeTask determines how the subtasks are executed. When a request is made to execute a CompositeTask, the CompositeTask delegates the request to its ItaskExecutionStrategy 1185, which in turn executes the subtasks in the manner prescribed by the strategy.

TaskExecutionStrategy 1187

TaskExecutionStrategy 1187 is the abstract base class for all execution strategies defined in the Task Management Service.

SerialExecutionStrategy 1170

The SerialExecutionStrategy 1170 class executes the subtasks of a CompositeTask in a sequential fashion in the order that the subtasks were added to the CompositeTask. The subtasks are executed in the same thread as the parent CompositeTask.

ParallelExecutionStrategy 1172

The ParallelExecutionStrategy 1172 class executes the subtasks of a CompositeTask in a parallel fashion. The ParallelExecutionStrategy 1172 executes the subtasks of the CompositeTask in separate threads. It uses the TaskThreadAllocationManager 1150 to request threads for the subtasks passing itself as the ITaskExecutor for those tasks. When a thread is available for a subtask, the TaskThreadAllocationManager 1150 calls back the ParallelExecutionStrategy 1172 so that the subtask can be executed. The ParallelExecutionStrategy 1172 uses a TaskCompletionService 1145 to execute the subtasks and wait for them to complete.

TaskCallable 1190

The TaskCallable 1190 class implements the java.util.concurrent.Callable interface. A Callable is essentially a java.lang.Runnable except it can return a result. In this case, the result is a TaskExecutionResult 1192. The TaskCallable 1190 class wraps a Task instance. When the TaskCallable call( ) method is invoked, the Task is executed. The TaskCallable 1190 is passed to the TaskCompletionService 1145 to execute a task.

Task 1194

Task 1194 is a wrapper class for a modeled CMP_Task that is executed by the Task Management Service.

CompositeTask 1196

CompositeTask 1196 is a wrapper class for a modeled CMP_CompositeTask that is executed by the Task Management Service.

TaskExecutionResult 1192

TaskExecutionResult 1192 is a wrapper class for a modeled CMP_TaskExecutionResult. It captures the result of executing a task in the Task Management Service.

CompositeTaskExecutionResult 1198

CompositeTaskExecutionResult 1198 extends TaskExecutionResult 1192 and is returned when a CompositeTask 1196 is executed. The CompositeTaskExecutionResult 1198 contains references to the individual TaskExecutionResults 1192 for the subtasks of the CompositeTask 1196 and reflects the overall success or failure of the CompositeTask execution.

Task Execution in the Task Management Service

The following describes the process of executing a top-level Task submitted to the Task Management Service for execution. It describes the steps involved in the execution of the task and how the classes involved interact.

1) When a Task 1194 is submitted for execution to the Task Management Service 1105, the TaskExecutionManager 1110 submit( ) method is called.

2) The submit( ) method places the Task 1194 on the TaskQueueManager 1130 Task queue by invoking the queueTask( ) method.

3) The TaskExecutionManagerAllocator 1115 reads the Task 1194 from the Task queue by invoking the getNextTask( ) method. Note that this call blocks until a Task is placed on the queue.

4) The TaskExecutionManagerAllocator 1115 requests a thread for the Task 1194 from the TaskThreadAllocationManager 1150 by calling the allocateThread( ) method passing Task and the TaskExecutionManager 1110, which implements the ITaskExecutor 1140 interface.

5) The TaskThreadAllocationManager 1150 determines which TaskThreadAllocator to use for the Task depending upon the type of the Task and delegates the call by invoking the allocateThread( ) method for that TaskThreadAllocator.

6) The TaskThreadAllocator then determines if there is an available thread in its ITaskExecutorService 1180. It does this by invoking getMaxThreads( ) for the ITaskExecutorService 1180 and comparing that number against the number of Tasks in its allocated Tasks list. If a thread is available, the Task is allocated a thread. If a thread is not available, the Task is placed in the TaskThreadAllocator Task queue. When a thread is deallocated via the deallocateThread( ) method, the first Task in the Task queue is allocated the newly available thread.

7) When the TaskThreadAllocator allocates a thread for a Task, it calls back the TaskExecutionManager 1110 through the ITaskExecutor 1180 execute( ) method passing the Task 1194 and the ITaskExecutorService 1180 from which the thread was allocated.

8) The TaskExecutionManager 1110 can now execute the Task. It wraps the task in a TaskCallable 1190 and invokes the submit( ) method of its TaskCompletionService 1145, passing the TaskCallable 1190 and the ITaskExecutorService 1180 returned by the TaskThreadAllocator.

9) The TaskCompletionService 1145 wraps the passed TaskCallable 1190 in a Java 5 FutureTask and calls the execute( ) method of the passed ITaskExecutorService 1180.

10) The ITaskExecutorService 1180 executes the Task on its Java 5 ExecutorService. Execution of the Task invokes the call( ) method of the TaskCallable 1190, which in turn calls the execute( ) method of the Task. When the Task completes, the TaskExecutionResult 1192 is placed in the results queue of the TaskCompletionService 1145.

11) The TaskExecutionManagerMonitor 1120 is continuously monitoring the results queue of the TaskCompletionService 1145 by invoking the take( ) method, which blocks until a result is available on the queue. When a result is available, the monitor deallocates the thread for the Task by calling the TaskThreadAllocationManager 1135 deallocateThread( ) method. The monitor also places the TaskExecutionResult 1192 on the TaskExecutionManager 1110 results queue.

12) The TaskThreadAllocationManager 1135 determines which TaskThreadAllocator allocated the thread for the Task. It then delegates the deallocateThread( ) call to that TaskThreadAllocator.

13) The TaskThreadAllocator removes the Task from its allocated Task list and if there is a Task waiting for a thread in its Task queue, allocates the thread to the first Task in the queue as described previously.

14) Meanwhile, the TaskExecutionManagerNotifier 1125 is continuously monitoring the results queue of the TaskExecutionManager 1110 by invoking the poll( ) method, which blocks until a result is available on the queue. When a result is available it notifies any registered ITaskExecutionListeners 1155 of the completed Task.

Parallel CompositeTask Execution

In the task execution process described in the previous section, the Task 1194 is executed in Step 10). For a simple task, the underlying modeled CMP_Task is executed. For a CompositeTask 1196 with SerialExecutionStrategy 1170, the subtasks are simply executed in order in the same thread as the parent CompositeTask 1196. For a CompositeTask 1196 with a ParallelExecutionStrategy 1172, the process is a bit more involved. This section describes the process of executing a parallel CompositeTask 1196.

1) When a CompositeTask 1196 is executed, the CompositeTask 1196 invokes the executeTask( ) method of its associated ParallelExecutionStrategy 1172.

2) The ParallelExecutionStrategy 1172 invokes the allocateThreads( ) method of the TaskThreadAllocationManager 1135 passing the subtasks of the CompositeTask 1196 and itself as the ITaskExecutor 1140 for those tasks. The ParallelExecutionStrategy 1172 then waits for the tasks to complete execution by invoking the take( ) method of its TaskCompletionService 1145. This call blocks until a task submitted to the TaskCompletionService 1145 completes execution and the results is placed on the results queue of the TaskCompletionService 1145.

3) In the TaskThreadAllocationManager 1150 threads are allocated for the subtasks of the CompositeTask 1196. The process is exactly as described above in steps 5) and 6). When a thread is allocated for a subtask, the ITaskExecutor 1140 for the subtask is called back as described in 7) except in this case, the ITaskExecutor 1140 is the ParallelExecutionStrategy 1172.

4) When notified by the TaskThreadAllocationManager 1135 that a subtask has been allocated a thread and can be executed, the ParallelExecutionStrategy 1172 submits the subtask for execution to its TaskCompletionService 1145. This occurs for each of the subtasks of the CompositeTask 1196.

5) Meanwhile, the executeTask( ) method of the ParallelExecutionStrategy 1172 in blocking on the TaskCompletionService 1145 take( ) method waiting for a subtask to complete execution. As each subtask completes, the TaskExecutionResult 1192 is retrieved from the TaskCompletionService 1145. The thread used for the subtask is deallocated by calling the deallocateThread( ) method for the TaskThreadAllocationManager 1150. In addition, the TaskExecutionResult 1192 is placed on the TaskExecutionManager 1110 results queue, so that ITaskExecutionListeners 1155 are notified.

6) When all subtasks have completed execution, the executeTask( ) method of the ParallelExecutionStrategy 1172 exits returning a CompositeTaskExecutionResult 1192 containing the individual results of the executed subtasks.

As discussed above, techniques herein are well suited for use in an environment (e.g., storage area network environments) in which tasks and corresponding sub-tasks are executed by multiple pools of processing threads. However, it should be noted that embodiments herein are not limited to use in such applications.

While this invention has been particularly shown and described with references to preferred embodiments thereof, it will be understood by those skilled in the art that various changes in form and details may be made therein without departing from the spirit and scope of the present application as defined by the appended claims. Such variations are covered by the scope of this present application. As such, the foregoing description of embodiments of the present application is not intended to be limiting. Rather, any limitations to the invention are presented in the following claims.

What is claimed is:

1. A method comprising:
analyzing a task to identify a first type of sub-tasks of the task;
analyzing the task to identify a second type of sub-tasks of the task to be executed in parallel;

maintaining a first pool of processing threads dedicated to execute the first type of sub-tasks to include a fixed number of processing threads for executing the first type of sub-tasks;

maintaining a second pool of processing threads dedicated to execute the second type of sub-tasks to include a dynamic number of processing threads that automatically changes depending on a number of the second type of sub-tasks to be executed in parallel;

monitoring for availability of threads in a first pool of processing threads;

sequentially submitting, as processing threads in the first pool become free, at least one of the first type of sub-tasks associated with the task for execution by respective free processing threads in the first pool;

executing, via the first pool of processing threads, the first type of sub-tasks based on availability of processing threads in the first pool, wherein executing the first type of sub-tasks based on availability of processing threads in the first pool includes initially detecting that all of the processing threads in the first pool are busy executing other sub-tasks of the first type; and executing, via the second pool of processing threads, the second type of sub-tasks in parallel.

2. A method as in claim 1, wherein maintaining a second pool of processing threads dedicated to execute the second type of sub-tasks to include a dynamic number of processing threads that automatically changes depending on a number of the second type of sub-tasks to be executed in parallel includes:

maintaining the second pool of processing threads, including processing threads used to execute any respective sub-tasks, to include at least two processing threads of the second pool of processing threads, regardless of whether the processing threads are used to execute any respective sub-tasks; and initiating creation of additional processing threads in the second pool in response to detecting that there are currently not enough free processing threads in the second pool to execute a second type of sub-tasks associated with the task in parallel.

3. A method as in claim 2, wherein executing, via the first pool of processing threads, the first type of sub-tasks based on availability of processing threads in the first pool includes:

identifying that there are currently no available processing threads in the first pool to execute the first type of sub-tasks;

monitoring availability of free processing threads in the first pool; and sequentially submitting at least a portion of the first type of sub-tasks to the first pool as processing threads in the first pool become free.

4. A method as in claim 1 further comprising:

identifying a main task at a root of a task hierarchy;

identifying serial sub-tasks and parallel sub-tasks in the hierarchy beneath the main task;

grouping the main task and at least one serial sub-task for execution by a corresponding processing thread in the first pool;

grouping multiple serial sub-tasks in the task hierarchy for execution by a corresponding processing thread in the first pool; and reserving the parallel sub-tasks for simultaneous execution of the parallel sub-tasks by processing threads in the second pool.

5. A method as in claim 1 further comprising:

identifying when processing threads in the second pool complete execution of corresponding assigned tasks; and when there are enough free processing threads in the second pool to execute all of the second type of sub-tasks associated with the task in parallel, submitting all of the second type of sub-tasks to the second pool for execution.

6. A method as in claim 5 further comprising:

in response to submitting all of the second type of sub-tasks associated with the task to the second pool for execution, reserving a number of processing threads in the first pool equal to a number of sub-tasks in the first pool; and as reserved processing threads in the second pool free up as a result of completing execution of corresponding sub-tasks associated with the received task, maintaining freed processing threads in the second pool as being available for executing other tasks executed via the second pool.

7. A method as in claim 1 further comprising analyzing a task execution strategy associated with the task, the task execution strategy specifying different levels of parent sub-tasks associated with the received task to be executed in parallel as well as different groupings of corresponding child sub-tasks spawned by the parent sub-tasks to be executed in parallel.

8. A method as in claim 7 further comprising:

utilizing the second pool of processing threads to execute the parent sub-tasks at a first level in the task execution strategy; and utilizing a third pool of processing threads to execute the corresponding child sub-tasks at a second level in the task execution strategy.

9. A method as in claim 1 further comprising:

based on executing the received task via the processing threads in the first pool and the second pool, receiving additional portions of the task for execution;

analyzing the additional portions of the task to identify additional portions of the first type;

analyzing the additional portions of the task to identify additional portions of the second type;

via the first pool of processing threads, executing the additional portions of the first type; and via the second pool of processing threads, executing the additional portions of the second type.

10. A method comprising:

processing a task to identify independent portions of the task;

processing the task to identify dependent portions of the task;

maintaining a first pool of processing threads dedicated to execute the independent portions of the task to include a fixed number of processing threads for executing the independent portions of the task;

maintaining a second pool of processing threads dedicated to execute the dependent portions of the task to include a dynamic number of processing threads that automatically changes depending on a number of the dependent portions of the task to be executed in parallel;

monitoring for availability of threads in a first pool of processing threads;

sequentially submitting, as processing threads in the first pool become free, the independent portions of the task for execution by respective free processing threads in the first pool, wherein submitting the independent portions of the task for execution includes initially detecting that all of the processing threads in the first pool are busy executing other independent portions of the task; and submitting the dependent portions of the task for execution by the second pool of processing threads.

11. A method as in claim 10, wherein maintaining a second pool of processing threads dedicated to execute the dependent portions of the task to include a dynamic number of processing threads that automatically changes depending on a number of the dependent portions of the task to be executed in parallel includes creating additional processing threads in the second pool in response to detecting that there are currently no free processing threads in the second pool to execute a dependent portion of the task submitted for execution.

12. A method as in claim 10 further comprising:

identifying a first set of independent groupings of code associated with the task for execution by the first pool of processing threads, each of the independent groupings of code in the first set, when executed, completing execution independently of other portions of the task completing execution; and identifying a second set of dependent groupings of code associated with the task for execution by the second pool of processing threads, each group of the dependent groupings of code in the second set, when executed, depending on completion of other portions of the task in order to complete execution.

13. A computer system comprising:

at least one processor;

a memory unit that stores instructions associated with an application executed by the at least one processor; and an interconnect coupling the at least one processor and the memory unit, enabling the computer system to execute the application and perform operations of:

analyzing a task to identify a first type of sub-tasks of the task;

analyzing the task to identify a second type of sub-tasks of the task to be executed in parallel;

maintaining a first pool of processing threads dedicated to execute the first type of sub-tasks to include a fixed number of processing threads for executing the first type of sub-tasks;

maintaining a second pool of processing threads dedicated to execute the second type of sub-tasks to include a dynamic number of processing threads that automatically changes depending on a number of the second type of sub-tasks to be executed in parallel;

monitoring for availability of threads in a first pool of processing threads;

sequentially submitting, as processing threads in the first pool become free, at least one of the first type of sub-tasks associated with the task for execution by respective free processing threads in the first pool;

initiating execution, via the first pool of processing threads, of the first type of sub-tasks based on availability of processing threads in the first pool, wherein initiating execution of the first type of sub-tasks based on availability of processing threads in the first pool includes initially detecting that all of the processing threads in the first pool are busy executing other sub-tasks of the first type; and initiating execution, via the second pool of processing threads, of the second type of sub-tasks in parallel.

14. A computer system as in claim 13, wherein maintaining a second pool of processing threads dedicated to execute the second type of sub-tasks to include a dynamic number of processing threads that automatically changes depending on a number of the second type of sub-tasks to be executed in parallel includes:

maintaining the second pool of processing threads, including processing threads used to execute any respective sub-tasks, to include at least two processing threads, regardless of whether the processing threads are used to execute any respective sub-tasks; and initiating creation of additional processing threads in the second pool in response to detecting that there are currently not enough free processing threads in the second pool to execute a second type of sub-tasks associated with the task in parallel.

15. A computer system as in claim 13 further comprising analyzing a task execution strategy associated with the task, the task execution strategy specifying different levels of parent sub-tasks associated with the received task to be executed in parallel as well as different groupings of corresponding child sub-tasks spawned by the parent sub-tasks to be executed in parallel, the computer system further supporting operations of:

utilizing the second pool of processing threads to execute the parent sub-tasks at a first level in the task execution strategy; and maintaining and utilizing a third pool of processing threads to execute the corresponding child sub-tasks at a second level in the task execution strategy.

16. Software encoded on one or more non-transitory computer-readable storage media, when executed, the software operable to:

analyze a task to identify a first type of sub-tasks of the task;

analyze the task to identify a second type of sub-tasks of the task to be executed in parallel;

maintain a first pool of processing threads dedicated to execute the first type of sub-tasks to include a fixed number of processing threads for executing the first type of sub-tasks;

maintain a second pool of processing threads dedicated to execute the second type of sub-tasks to include a dynamic number of processing threads that automatically changes depending on a number of the second type of sub-tasks to be executed in parallel;

monitor for availability of threads in a first pool of processing threads;

sequentially submit, as processing threads in the first pool become free, at least one of the first type of sub-tasks associated with the task for execution by respective free processing threads in the first pool;

initiate execution, via the first pool of processing threads, of the first type of sub-tasks based on processing threads in the first pool, wherein executing the first type of sub-tasks based on availability of processing threads in the first pool includes initially detecting that all of the processing threads in the first pool are busy executing other sub-tasks of the first type; and initiate execution, via the second pool of processing threads, of the second type of sub-tasks in parallel.

* * * * *